(12) United States Patent
Ishida et al.

(10) Patent No.: US 11,038,456 B2
(45) Date of Patent: Jun. 15, 2021

(54) CONTROL APPARATUS FOR POLE-CHANGING ROTATING ELECTRIC MACHINE

(71) Applicant: DENSO CORPORATION, Kariya (JP)

(72) Inventors: Jun Ishida, Kariya (JP); Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/722,599

(22) Filed: Dec. 20, 2019

(65) Prior Publication Data

US 2020/0127591 A1    Apr. 23, 2020

Related U.S. Application Data

(63) Continuation of application No. PCT/JP2018/021479, filed on Jun. 5, 2018.

(30) Foreign Application Priority Data

Jun. 20, 2017    (JP) .............................. JP2017-120697

(51) Int. Cl.
```
H02P 21/00      (2016.01)
H02P 25/20      (2006.01)
H02P 21/22      (2016.01)
H02P 21/26      (2016.01)
B60L 15/02      (2006.01)
H02K 1/14       (2006.01)
H02P 27/06      (2006.01)
```
(52) U.S. Cl.
CPC ............ *H02P 25/20* (2013.01); *B60L 15/025* (2013.01); *H02K 1/146* (2013.01); *H02P 21/22* (2016.02); *H02P 21/26* (2016.02); *H02P 27/06* (2013.01); *B60L 2220/58* (2013.01)

(58) Field of Classification Search
USPC .......................................................... 318/560
See application file for complete search history.

(56) References Cited

U.S. PATENT DOCUMENTS 4,028,572 A  *  6/1977  Baltisberger ............. H02K 3/28
                                                       310/201
4,127,787 A  *  11/1978  Auinger ................... H02K 3/28
                                                       310/184

(Continued)

*Primary Examiner* — Bentsu Ro
(74) *Attorney, Agent, or Firm* — Oliff PLC

(57) ABSTRACT

A control apparatus is provided to control a rotating electric machine whose number of poles is switched from a pre-switching number of poles to a post-switching number of poles. The control apparatus includes a pre-switching control unit, a post-switching control unit and a transition control unit. The pre-switching control unit controls the torque generated by the machine before the switching of the number of poles. The post-switching control unit controls the torque generated by the machine after the switching. During a pole-number switching period, the transition control unit controls electric currents flowing in stator coils of the machine or voltages applied to the stator coils to make each magnetic pole formed with control by the pre-switching control unit not coincident with any magnetic pole formed with control by the post-switching control unit and having the same polarity as the magnetic pole formed with the control by the pre-switching control unit.

10 Claims, 18 Drawing Sheets

(56) References Cited

U.S. PATENT DOCUMENTS

| | | | | |
|---|---|---|---|---|
| 4,144,470 A | * | 3/1979 | Auinger | H02K 17/14 |
| | | | | 310/198 |
| 6,008,616 A | | 12/1999 | Nagayama et al. | |
| 2012/0007578 A1 | * | 1/2012 | Austermann | H02K 3/28 |
| | | | | 323/359 |
| 2014/0049139 A1 | * | 2/2014 | Peng | H02K 3/28 |
| | | | | 310/68 R |

* cited by examiner

⟨4 POLES⟩

⟨8 POLES⟩

------- 4-POLE MAGNETIC FLUX PATHS
------- 8-POLE MAGNETIC FLUX PATHS

COMPARATIVE EXAMPLE

⟨SLIP ANGULAR FREQUENCY − TORQUE CHARACTERISTICS (8 POLES)⟩

⟨SLIP ANGULAR FREQUENCY − TORQUE CHARACTERISTICS (4 POLES)⟩

US 11,038,456 B2

CONTROL APPARATUS FOR POLE-CHANGING ROTATING ELECTRIC MACHINE

CROSS-REFERENCE TO RELATED APPLICATIONS

The present application is a continuation application of International Application No. PCT/JP2018/021479 filed on Jun. 5, 2018, which is based on and claims priority from Japanese Patent Application No. 2017-120697 filed on Jun. 20, 2017. The contents of these applications are hereby incorporated by reference in their entirety into the present application.

BACKGROUND

1 Technical Field

The present disclosure relates to a control apparatus for a rotating electric machine the number of poles of which is changeable.

2 Description of Related Art

There is known a control apparatus which is configured to switch the number of poles of a rotating electric machine between A (e.g., 4) and (n×A) (e.g., 2×4=8), where each of A and n is an integer greater than or equal to 2. For example, when switching the number of poles of the rotating electric machine from 8 to 4, the control apparatus gradually decreases the torque of the rotating electric machine corresponding to 8 poles while gradually increasing the torque of the rotating electric machine corresponding to 4 poles.

SUMMARY

According to the present disclosure, there is provided a control apparatus which is configured to control a rotating electric machine whose number of poles is changeable. The rotating electric machine includes a stator. The stator includes an annular stator core and n sets of m-phase stator coils wound on the stator core, where n is an integer greater than or equal to 2 and m is an integer greater than or equal to 3. The number of poles of the rotating electric machine is switched by the control apparatus from a pre-switching number of poles to a post-switching number of poles. The pre-switching number of poles is one of A and (n×A) and the post-switching number of poles is the other of A and (n×A), where A is an even number greater than or equal to 2. The control apparatus includes a pre-switching control unit, a post-switching control unit and a transition control unit. The pre-switching control unit is configured to control, when the number of poles of the rotating electric machine is equal to the pre-switching number of poles, electric currents flowing in the stator coils to bring pre-switching torque into agreement with pre-switching command torque. The pre-switching torque is torque of the rotating electric machine corresponding to the pre-switching number of poles. The post-switching control unit is configured to control, when the number of poles of the rotating electric machine is equal to the post-switching number of poles, the electric currents flowing in the stator coils to bring post-switching torque into agreement with post-switching command torque. The post-switching torque is torque of the rotating electric machine corresponding to the post-switching number of poles. The transition control unit is configured to control parameters, during a pole-number switching period for which control of the rotating electric machine is switched from control by the pre-switching control unit to control by the post-switching control unit, to make each magnetic pole formed in the stator with the control by the pre-switching control unit not coincident in a circumferential direction of the stator with any magnetic pole which is formed in the stator with the control by the post-switching control unit and has the same polarity as the magnetic pole formed in the stator with the control by the pre-switching control unit. The parameters are the electric currents flowing in the stator coils or voltages applied to the stator coils.

DESCRIPTION OF EMBODIMENTS

Figure 1:
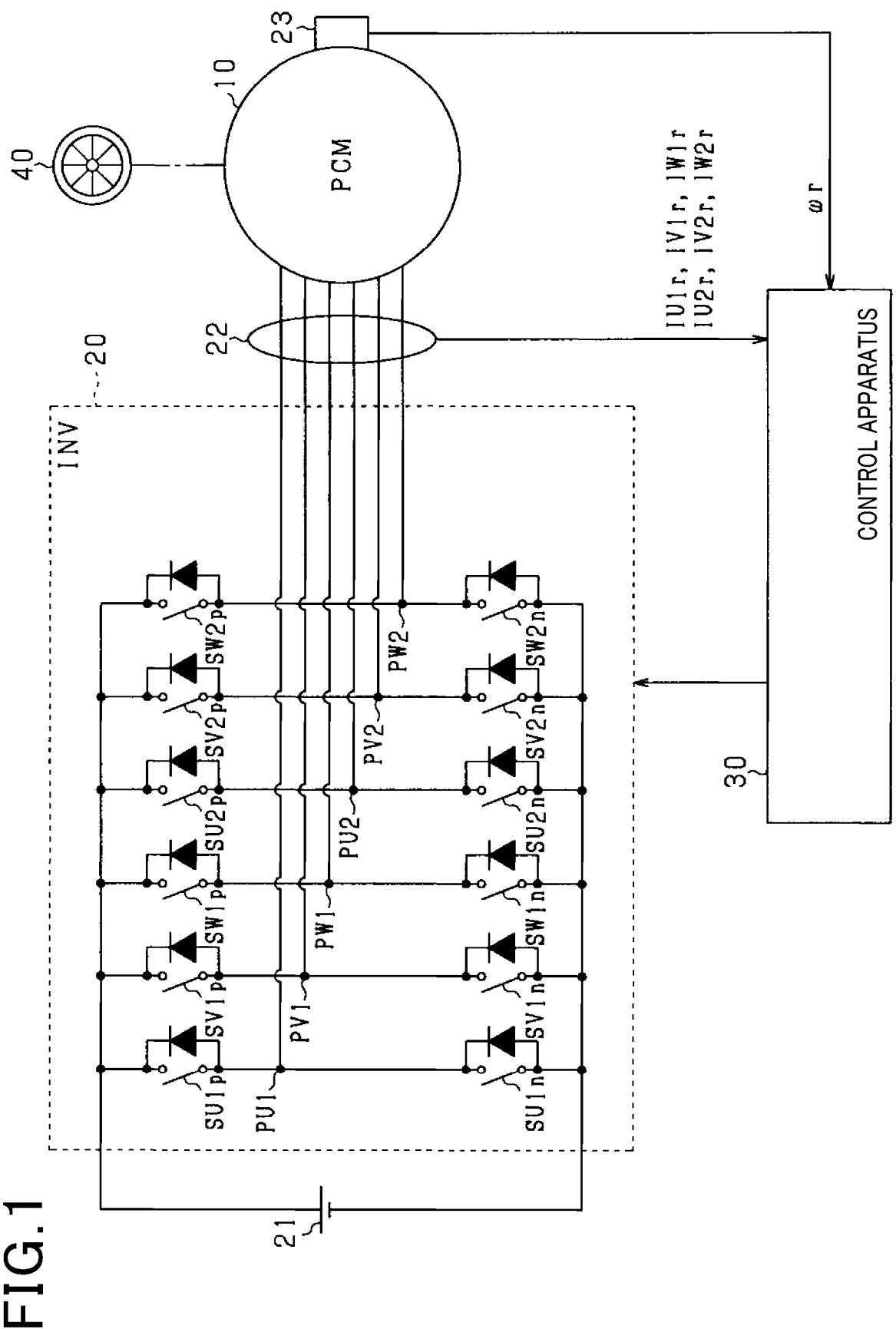
FIG. 1 is a schematic diagram illustrating the overall configuration of an in-vehicle control system which includes a control apparatus according to a first embodiment.

The inventors of the present application have found that the control apparatus known in the art (see, for example, Japanese Patent Application Publication No. JPH08223999A) involves the following problems.

During a transition period for which the number of poles of the rotating electric machine is switched from one of A and (n×A) to the other, both electric current corresponding to A poles and electric current corresponding to (n×A) poles flow in a stator coil of the rotating electric machine. Consequently, both magnetic flux corresponding to A poles and magnetic flux corresponding to (n×A) poles are generated in the rotating electric machine.

When no magnetic saturation occurs in the rotating electric machine due to resultant magnetic flux which is the resultant of the magnetic flux corresponding to A poles and the magnetic flux corresponding to (n×A) poles, the torque generated by the rotating electric machine is, in theory, equal to the sum of the torque corresponding to A poles and the torque corresponding to (n×A) poles. However, when magnetic saturation occurs in the rotating electric machine due to the resultant magnetic flux, the torque generated by the rotating electric machine becomes lower than the sum of the torque corresponding to A poles and the torque corresponding to (n×A) poles. As a result, the torque generated by the rotating electric machine cannot be brought into agreement with a desired value.

In contrast, in the above-described control apparatus according to the present disclosure, the pre-switching control unit is configured to control, when the number of poles of the rotating electric machine is equal to the pre-switching number of poles, the electric currents flowing in the stator coils to bring pre-switching torque into agreement with pre-switching command torque; the pre-switching torque is torque of the rotating electric machine corresponding to the pre-switching number of poles. The post-switching control unit is configured to control, when the number of poles of the rotating electric machine is equal to the post-switching number of poles, the electric currents flowing in the stator coils to bring post-switching torque into agreement with post-switching command torque; the post-switching torque is torque of the rotating electric machine corresponding to the post-switching number of poles.

During the pole-number switching period for which control of the rotating electric machine is switched from control by the pre-switching control unit to control by the post-switching control unit, there are generated in the stator both magnetic poles corresponding to the pre-switching number of poles with the control by the pre-switching control unit and magnetic poles corresponding to the post-switching number of poles with the control by the post-switching control unit. Therefore, if each magnetic pole corresponding to the pre-switching number of poles was coincident in the circumferential direction of the stator with any magnetic pole which corresponds to the post-switching number of poles and has the same polarity as the magnetic pole corresponding to the pre-switching number of poles, magnetic saturation would occur in the rotating electric machine due to resultant magnetic flux which is the resultant of magnetic flux corresponding to the pre-switching number of poles and magnetic flux corresponding to the post-switching number of poles. Consequently, the torque generated by the rotating electric machine would become lower than the sum of the torque corresponding to the pre-switching number of poles and the torque corresponding to the post-switching number of poles.

To solve the above problems, in the above-described control apparatus according to the present disclosure, during the pole-number switching period, the transition control unit controls the parameters, which are the electric currents flowing in the stator coils or the voltages applied to the stator coils, to make each magnetic pole formed in the stator with the control by the pre-switching control unit not coincident in the circumferential direction of the stator with any magnetic pole which is formed in the stator with the control by the post-switching control unit and has the same polarity as the magnetic pole formed in the stator with the control by the pre-switching control unit. Consequently, the magnetic flux corresponding to the pre-switching number of poles and the magnetic flux corresponding to the post-switching number of poles are distributed to suppress occurrence of magnetic saturation in the rotating electric machine. As a result, it becomes possible to suppress reduction in the torque generated by the rotating electric machine during the pole-number switching period due to magnetic saturation.

Exemplary embodiments will be described hereinafter with reference to the drawings. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

A control apparatus 30 according to the first embodiment is applied to a vehicle which includes a rotating electric machine 10 as an in-vehicle main machine, such as an electric vehicle or a hybrid vehicle.

FIG. 1 shows the overall configuration of an in-vehicle control system which includes the rotating electric machine 10, an inverter 20 and the control apparatus 30.

The rotating electric machine 10 is configured to generate and output mechanical power (or torque) to drive wheels 40 of the vehicle. In the present embodiment, the rotating electric machine 10 is configured as a squirrel-cage induction machine whose number of poles is changeable. More particularly, the number of poles of the rotating electric machine 10 is switchable between 4 and 8. In addition, induction motors whose numbers of poles can be changed are generally referred to as pole-changing motors.

Figure 2:
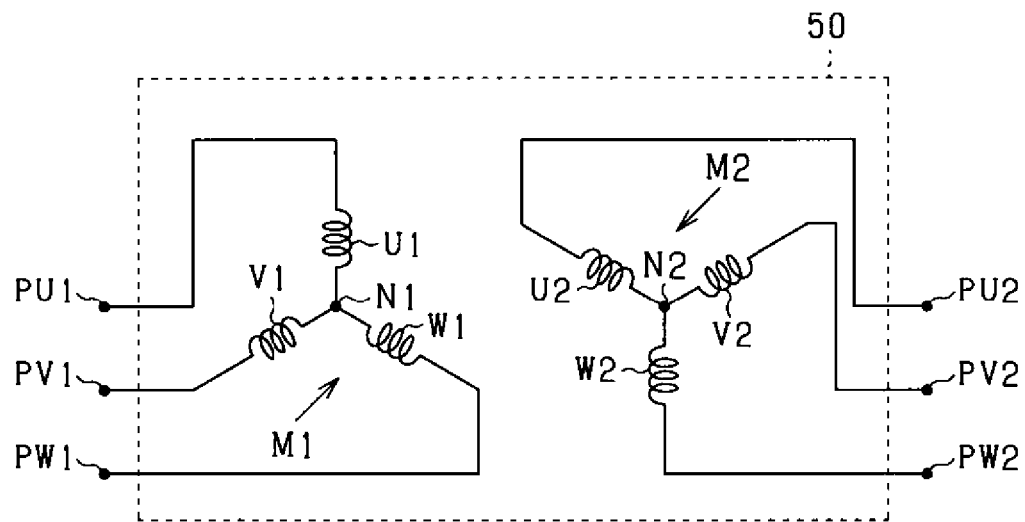
FIG. 2 is a schematic diagram illustrating the configuration of first and second stator coils of a pole-changing rotating electric machine that is included in the in-vehicle control system and controlled by the control apparatus.

As shown in FIG. 2, a stator 50 of the rotating electric machine 10 includes a first winding group M1 and a second winding group M2. The first winding group M1, which constitutes a first three-phase stator coil of the rotating electric machine 10, includes a first U-phase winding U1, a first V-phase winding V1 and a first W-phase winding W1. On the other hand, the second winding group M2, which constitutes a second stator coil of the rotating electric machine 10, includes a second U-phase winding U2, a second V-phase winding V2 and a second W-phase winding W2. First ends of the first U-phase, first V-phase and first W-phase windings U1, V1 and W1 are connected to define a first neutral point N1 therebetween. The first U-phase, first V-phase and first W-phase windings U1, V1 and W1 are offset from each other by an electrical angle of 120°. Similarly, first ends of the second U-phase, second V-phase and second W-phase windings U2, V2 and W2 are connected to define a second neutral point N2 therebetween. The second U-phase, second V-phase and second W-phase windings U2, V2 and W2 are offset from each other by an electrical angle of 120°. Referring back to FIG. 1, the rotating electric machine 10 is connected to a battery 21 (i.e., a DC power supply) via the inverter 20 which is a six-phase inverter in the present embodiment.

The inverter 20 includes six serially-connected switch pairs which respectively correspond to the six phases and each of which consists of an upper-arm switch and a lower-arm switch.

A second end of the first U-phase winding U1 is connected to a junction point PU1 between the first U-phase upper-arm and lower-arm switches SU1$p$ and SU1$n$. A second end of the first V-phase winding V1 is connected to a junction point PV1 between the first V-phase upper-arm and lower-arm switches SV1$p$ and SV1$n$. A second end of the first W-phase winding W1 is connected to a junction point PW1 between the first W-phase upper-arm and lower-arm switches SW1$p$ and SW1$n$. A second end of the second U-phase winding U2 is connected to a junction point PU2 between the second U-phase upper-arm and lower-arm switches SU2$p$ and SU2$n$. A second end of the second V-phase winding V2 is connected to a junction point PV2 between the second V-phase upper-arm and lower-arm switches SV2$p$ and SV2$n$. A second end of the second W-phase winding W2 is connected to a junction point PW2 between the second W-phase upper-arm and lower-arm switches SW2$p$ and SW2$n$.

Each of the switches SU1$p$-SW2$n$ is implemented by, for example, a voltage-controlled semiconductor switching element such as an IGBT or an N-channel MOSFET. Moreover, each of the switches SU1$p$-SW2$n$ has a diode connected in antiparallel thereto.

The control system also includes a current sensor 22 and a speed sensor 23. The current sensor 22 detects each phase current flowing through the rotating electric machine 10. In FIG. 1, detected values of electric currents flowing through the first U, V and W phases and second U, V and W phases are respectively designated by IU1$r$, IV1$r$, IW1$r$, IU2$r$, IV2$r$ and IW2$r$. The speed sensor 23 detects the mechanical angular frequency ω$r$ of a rotor 52 of the rotating electric machine 10. All the detected values are inputted from the current sensor 22 and the speed sensor 23 to the control apparatus 30.

The control apparatus 30 is configured mainly with a microcomputer. The control apparatus 30 operates the inverter 20 to feedback-control torque of the rotating electric machine 10 to a command total-torque Tr*. The command total-torque Tr* is outputted from an upper-level (or host) control apparatus, which governs driving control of the vehicle, to the control apparatus 30.

Next, the configuration of the rotating electric machine 10 will be described with reference to FIGS. 3 and 4.

The rotating electric machine 10 includes the rotor 52 fixed to a rotating shaft 51, the stator 50 located to surround the rotor 52, and a housing 53 that houses both the rotor 52 and the stator 50. The rotor 52 and the stator 50 are arranged coaxially with each other. In the housing 53, there are provided bearings 54 and 55 by which the rotating shaft 51 and the rotor 52 are rotatably supported.

The rotor 52 includes a rotor core 52A and a plurality of electrical conductors 52B that are provided in a radially outer peripheral portion of the rotor core 52A along the circumferential direction. The rotor core 52A is formed by laminating a plurality of magnetic steel sheets in the axial direction and fixing them by, for example, staking.

The stator 50 includes an annular stator core 57, which has a plurality of slots 56 arranged in the circumferential direction, and the two sets of three-phase winding groups (or stator coils) M1 and M2 that are wound in a distributed winding manner so as to be received in the slots 56. In other words, both the winding groups M1 and M2 are wound on the same stator core 57.

The stator core 57 is formed by laminating a plurality of annular magnetic steel sheets in the axial direction and fixing them by, for example, staking. The stator core 57 has an annular yoke 57A and a plurality of teeth 57B that each protrude radially inward from the yoke 57A and are spaced at predetermined intervals in the circumferential direction. Each of the slots 56 is formed between one circumferentially-adjacent pair of the teeth 57B. In the present embodiment, the teeth 57B are formed at equal intervals in the circumferential direction. Each of the slots 56 is shaped to have an opening at a radially inner end thereof and be longer in a radial direction of the stator core 57 than in the circumferential direction. More particularly, in the present embodiment, in the stator core 57, there are formed a total of twenty-four slots 56 at equal intervals in the circumferential direction. In addition, slot numbers #1 to #24 are respectively assigned to the twenty-four slots 56.

In each of the slots 56, the stator coils (i.e., the first and second winding groups M1 and M2) are arranged in two layers, i.e., a radially inner layer and a radially outer layer. Moreover, in each of the slots 56, there is provided an insulator to surround the stator coils. In addition, in FIG. 4, of the two sets of winding groups M1 and M2, the windings of the first winding group M1 are designated by darker shading than the windings of the second winding group M2.

In the present embodiment, the slots 56 formed in the stator core 57 include both single-phase slots 56A and multi-phase slots 56B. In each of the single-phase slots 56A, there are received two winding portions which belong to the same winding group and the same phase and are energized in the same direction. In contrast, in each of the multi-phase slots 56B, there are received two winding portions which belong to different winding groups, but the same phase. The single-phase slots 56A are provided in the stator core 57 at predetermined intervals in the circumferential direction. The multi-phase slots 56B are also provided in the stator core 57 at predetermined intervals in the circumferential direction.

Figure 6:
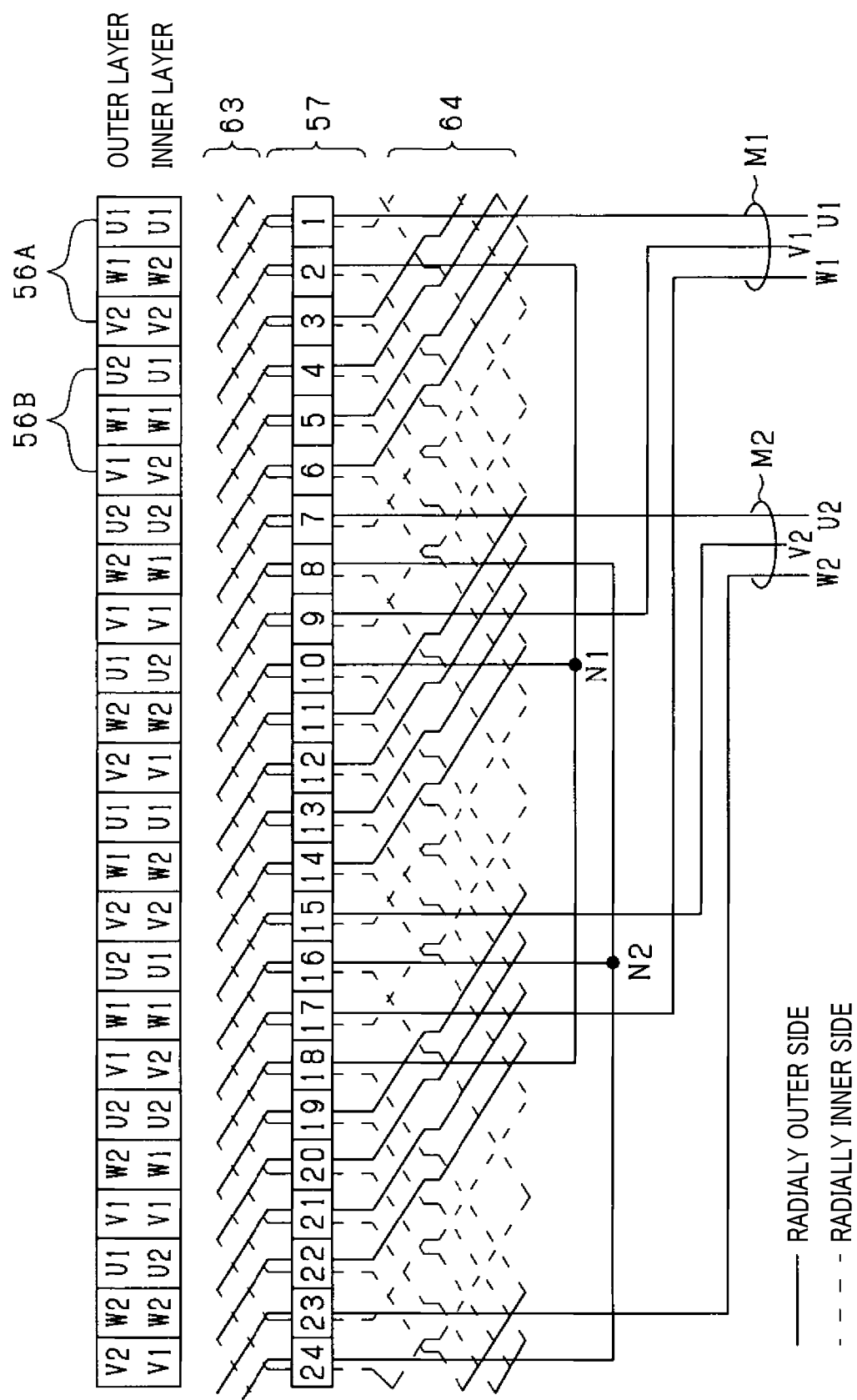
FIG. 6 is a connection diagram of the first and second stator coils.

FIG. 6 shows the arrangement of the winding groups M1 and M2 in the slots 56 of #1 to #24.

As shown in FIG. 6, in the #1 slot, a portion of the first U-phase winding U1 is arranged at the radially outer layer while another portion of the first U-phase winding U1 is arranged at the radially inner layer; both the portions of the first U-phase winding U1 are energized in the same direction. In the #2 slot, a portion of the first W-phase winding W1 of the first winding group M1 is arranged at the radially outer layer while a portion of the second W-phase winding W2 of the second winding group M2 is arranged at the radially inner layer.

That is, the #1 slot is a single-phase slot where two winding portions, both of which belong to the first U-phase winding U1 of the first winding group M1 (i.e., belong to the same winding group and the same phase), are received and energized in the same direction. In contrast, the #2 slot is a multi-phase slot in which two winding portions, which respectively belong to the first W-phase winding W1 of the first winding group M1 and the second W-phase winding W2 of the second winding group M2 (i.e., belong to different winding groups, but the same phase) are received.

Similarly, each odd-numbered slot such as #3, #5, #7 and so on are single-phase slots 56A, whereas each even-numbered slot such as #4, #6, #8 and so on are multi-phase slots 56B. In the present embodiment, the single-phase slots 56A and the multi-phase slots 56B are arranged in the stator core 57 alternately in the circumferential direction. That is, the single-phase slots 56A are provided at predetermined intervals in the circumferential direction for each phase; each of the multi-phase slots 56B is provided between one circumferentially-adjacent pair of the single-phase slots 56A.

Figure 5:
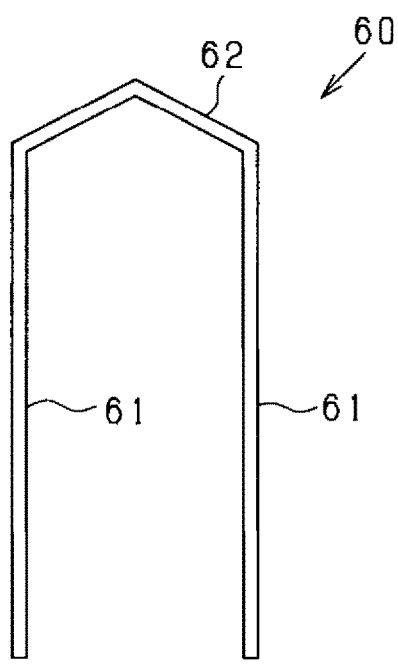
FIG. 5 is a plan view of one of electrical conductor segments which together constitute the first and second stator coils.

Each of the windings of the winding groups M1 and M2 is formed by connecting a plurality of electrical conductor segments 60. As shown in FIG. 5, each of the electrical conductor segments 60 is substantially U-shaped to have a pair of straight portions 61 and a turn portion 62 that connects ends of the straight portions 61 on the same side. After inserting the straight portions 61 of each of the electrical conductor segments 60 respectively into two slots 56 that are spaced from each other by a predetermined number of slots, distal end portions of the straight portions 61 on the opposite side to the turn portion 62 are bent in the circumferential direction of the stator core 57. Then, the distal end portions of the straight portions 61 of the electrical conductor segments 60 are joined to one another to form the winding. In each of the slots 56, there are received two electrical conductors which are constituted of the straight portions 61 of the electrical conductor segments 60.

Figure 3:
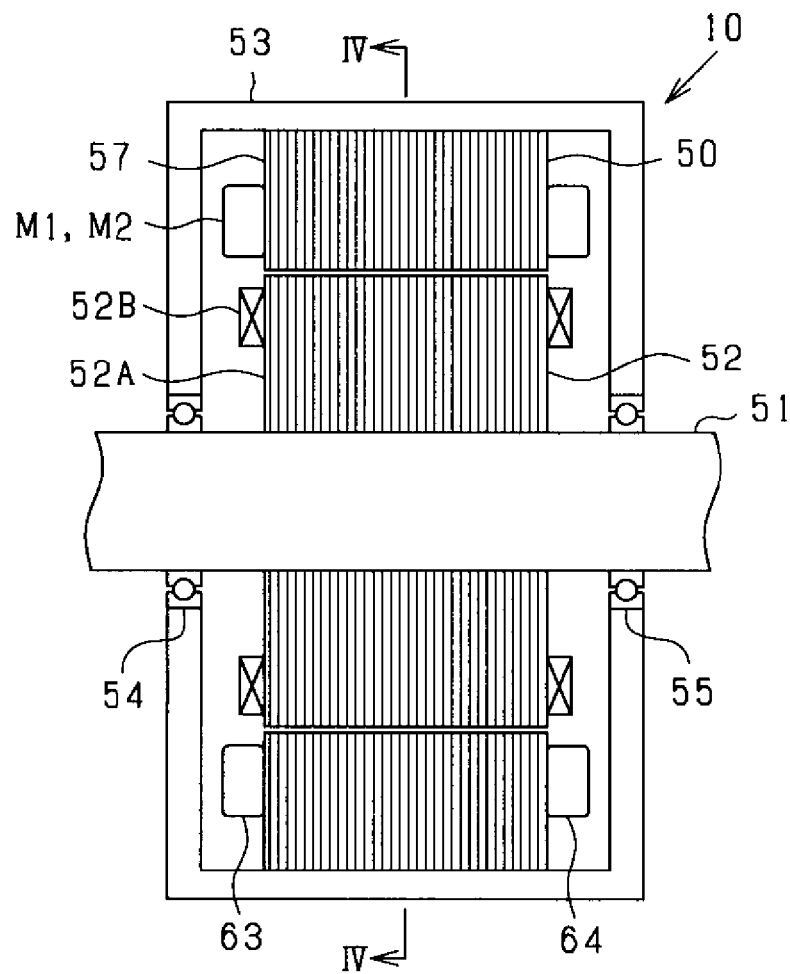
FIG. 3 is a longitudinal cross-sectional view of the pole-changing rotating electric machine.
Figure 4:
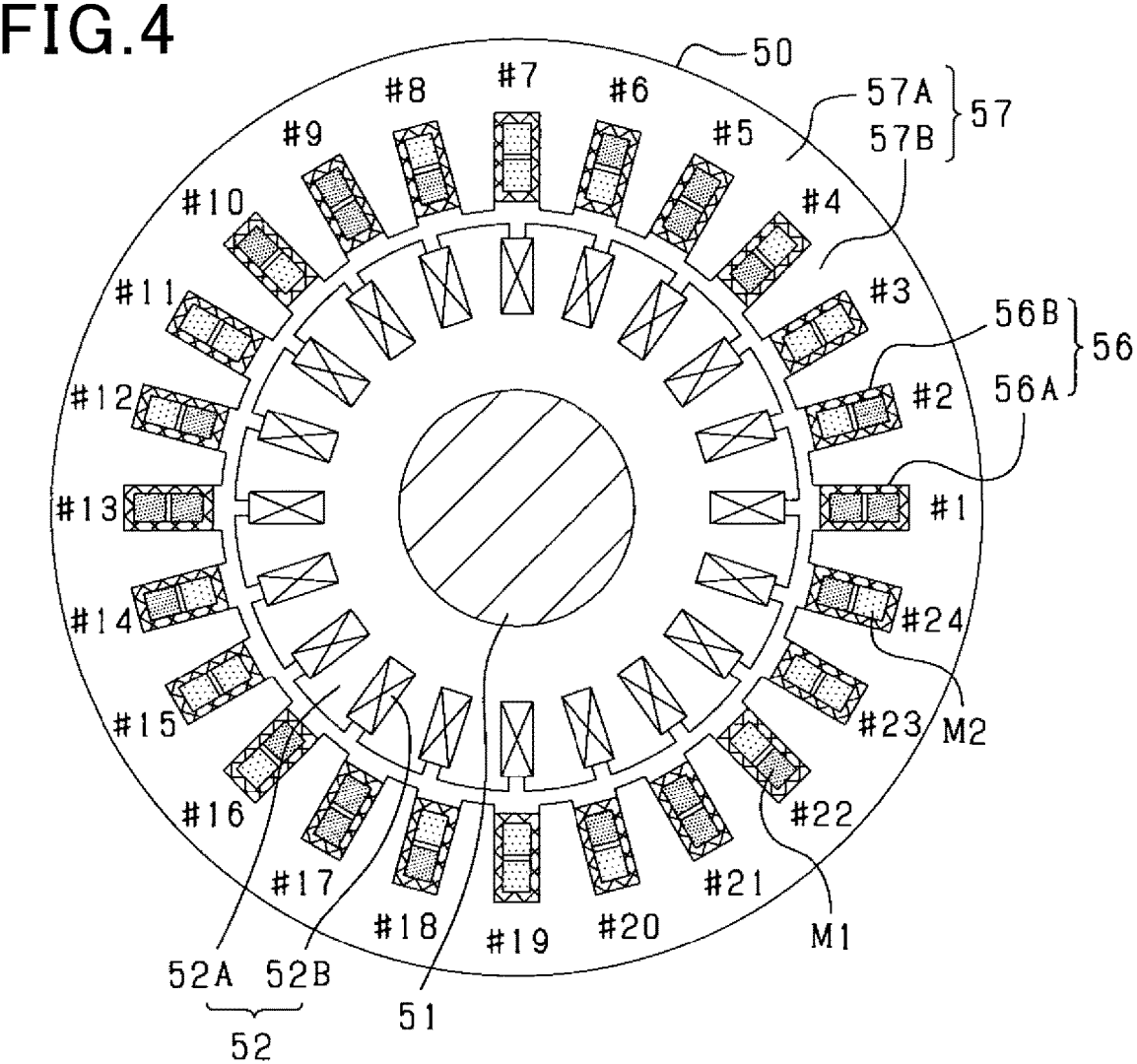
FIG. 4 is a transverse cross-sectional view, taken along the line IV-IV in FIG. 3, of both a rotor and a stator of the pole-changing rotating electric machine.

As shown in FIG. 3, on one axial side of the stator core 57, all the turn portions 62 of the electrical conductor segments 60 together constitute a first coil end 63. On the other axial side of the stator core 57, all the distal end portions of the electrical conductor segments 60 together constitute a second coil end 64.

Figure 7:
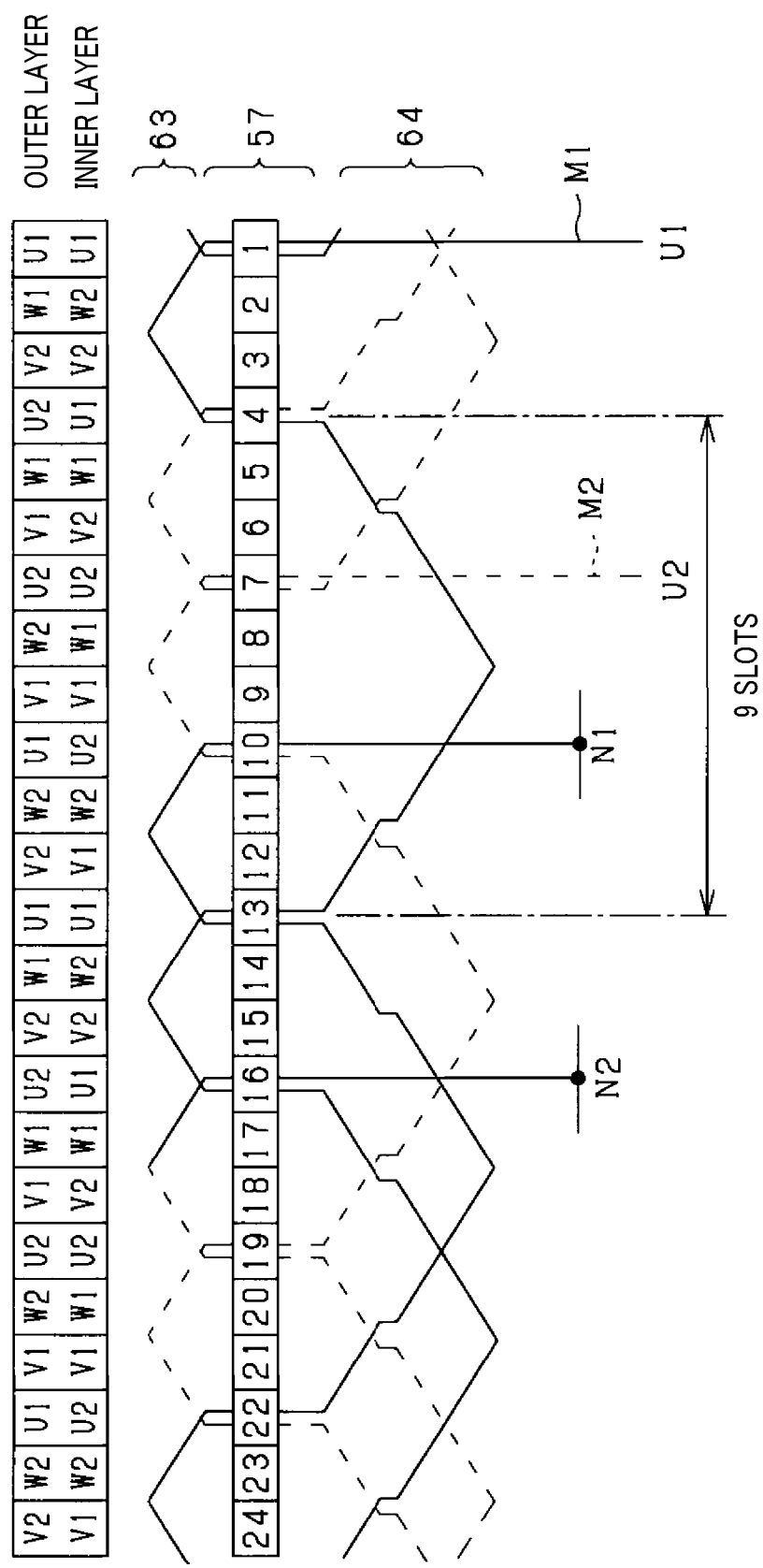
FIG. 7 is a connection diagram of first and second U-phase windings of the first and second stator coils.

For the sake of facilitating understanding, in FIG. 7, there are shown only the first U-phase winding U1 and the second U-phase winding U2 among the six windings of the first and second winding groups M1 and M2. The first U-phase winding U1 and the second U-phase winding U2 are of the same phase, but respectively belong to the first and second winding groups M1 and M2. In FIG. 7, the first U-phase winding U1 are shown with solid lines while the second U-phase winding U2 are shown with dashed lines. Those electrical conductor segments 60 which constitute the first U-phase winding U1 and the second U-phase winding U2 are inserted in the stator core 57 at intervals of 3 slots. At the second coil end 64, each corresponding pair of the electrical conductor segments 60, which are spaced at an interval of 9 slots, are connected to each other. In this case, in each of the winding groups M1 and M2, the slot interval (i.e., 9-slot interval) at the second coil end 64 is three times (i.e., the number of phases) the slot interval (i.e., 3-slot interval) at the first coil end 63.

Figure 8:
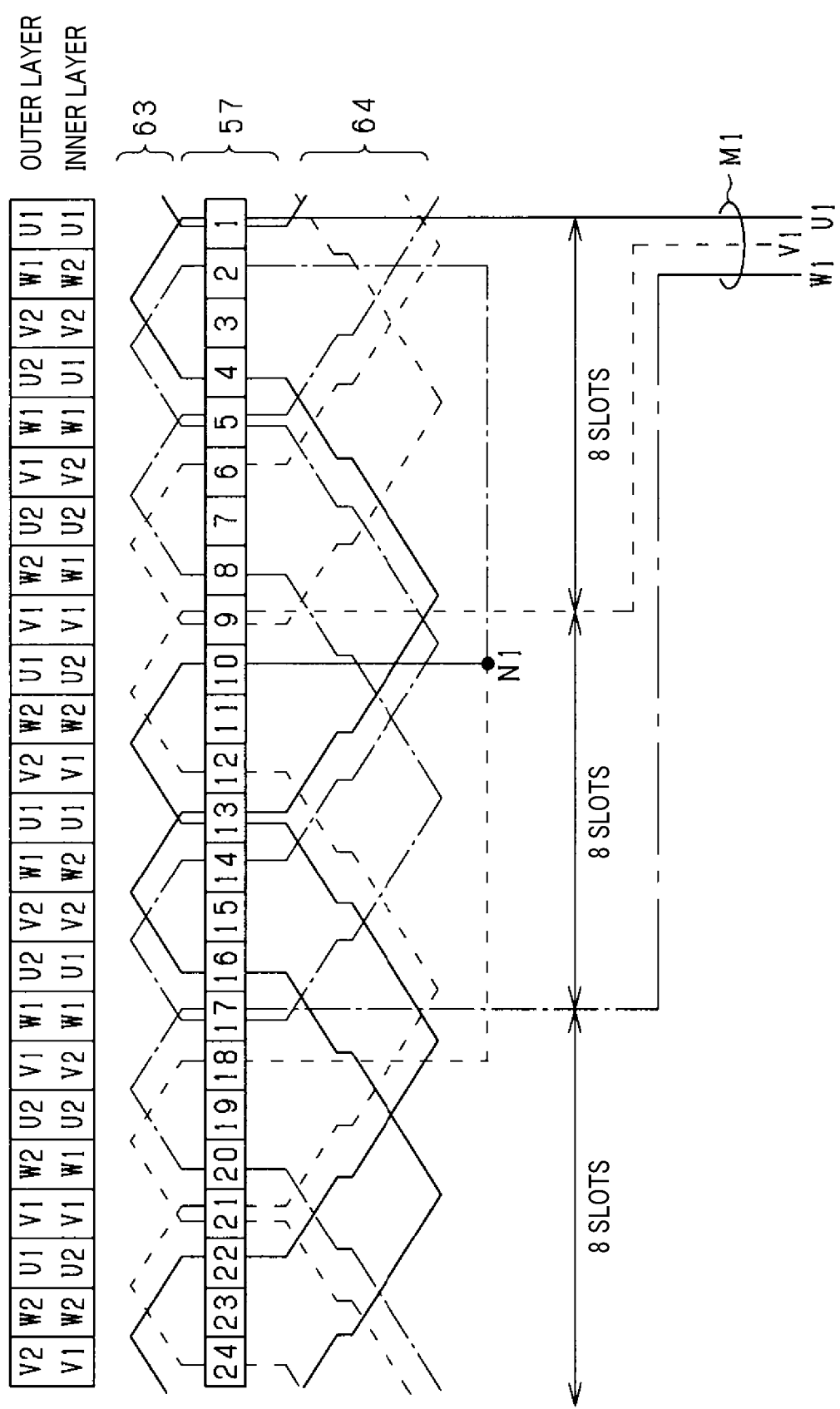
FIG. 8 is a connection diagram of the first stator coil.

Further, for the sake of facilitating understanding, in FIG. 8, there is shown only the first winding group M1 of the two winding groups M1 and M2. In FIG. 8, the first U-phase winding U1 is shown with solid lines; the first V-phase winding V1 is shown with dashed lines; and the first W-phase winding W1 is shown with one-dot chain lines. The first U-phase, first V-phase and first W-phase windings U1, V1 and W1 are uniformly wound on the stator core 57 by trisecting the circumference of the stator core 57. That is, each pair of the windings of the first winding group M1, which are adjacent to each other in the energization sequence, are wound on the stator core 57 at a fixed slot interval (i.e., 8-slot interval) in the circumferential direction. The windings of the first winding group M1 are wound in the same winding pattern, but offset from each other by 8 slots in the circumferential direction. This offset corresponds to an offset of a predetermined electrical angle (i.e., 120°) in the energization sequence of the windings of the first winding group M1. In addition, in the first winding group M1, the circumferential winding intervals between U1-V1, V1-W1 and W1-U1 are equal; in the second winding group M2, the circumferential winding intervals between U2-V2, V2-W2 and W2-U2 are equal.

In the present embodiment, the control apparatus 30 changes the number of poles of the rotating electric machine 10 by inverting, for each phase winding in the multi-phase slots 56B, the polarity due to energization thereof.

Figure 9:
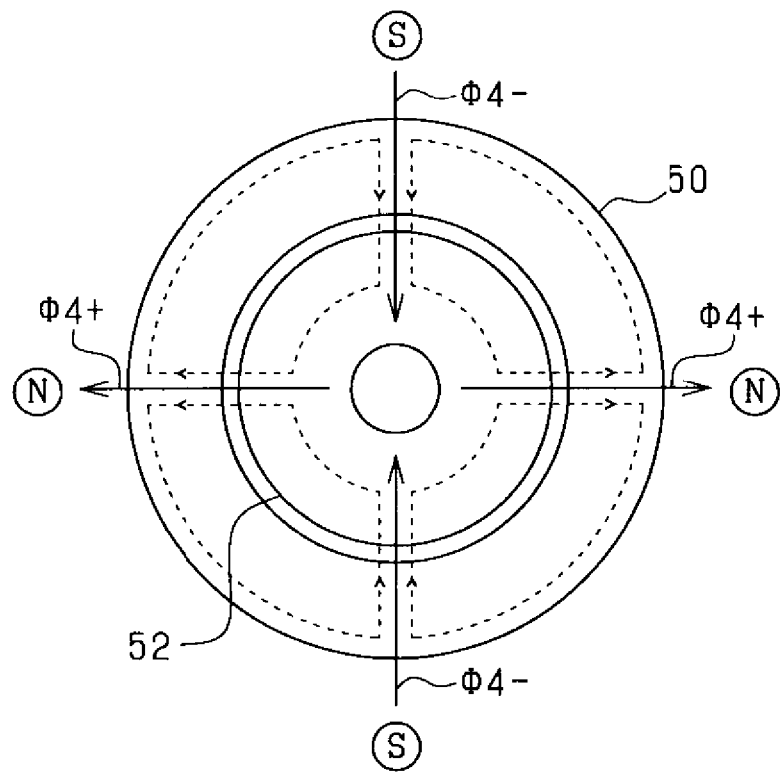
FIG. 9 is a schematic diagram illustrating magnetic flux paths formed in the pole-changing rotating electric machine in a 4-pole mode.

The control apparatus 30 performs 4-pole mode control to energize the two winding portions in each of the multi-phase slots 56B, which belong to different winding groups but the same phase, in the same direction. Consequently, the magnetomotive force distribution of the stator 50 becomes a magnetomotive force distribution corresponding to 4 poles and full-pitch winding. As a result, as shown in FIG. 9, N poles and S poles are alternately arranged at intervals of 90° in mechanical angle in the circumferential direction of the stator 50; the number of the N and S poles is equal to 4. In this case, the phase currents IU1-IW2, which can be determined by the following equation (eq1), flow respectively through the phase windings U1-W2.

In the following equation (eq1), $\omega_{4c}$ represents a first primary angular frequency which is a primary angular frequency corresponding to 4 poles, $I_{m4}$ represents the phase-current amplitude, and $\alpha_4$ represents the phase-current phase.

$$\left. \begin{array}{l} I_{U1} = I_{m4}\cos(\omega_{4c}t + \alpha_4) \\ I_{V1} = I_{m4}\cos(\omega_{4c}t + \alpha_4 + 2\pi/3) \\ I_{W1} = I_{m4}\cos(\omega_{4c}t + \alpha_4 - 2\pi/3) \\ I_{U2} = -I_{m4}\cos(\omega_{4c}t + \alpha_4) \\ I_{V2} = -I_{m4}\cos(\omega_{4c}t + \alpha_4 + 2\pi/3) \\ I_{W2} = -I_{m4}\cos(\omega_{4c}t + \alpha_4 - 2\pi/3) \end{array} \right\} \quad \text{(eq1)}$$

In addition, in FIG. 9, the radially inward magnetic flux when the phase currents IU1-IW2 determined by the above equation (eq1) flow respectively through the phase windings U1-W2 is designated by φ4−; the radially outward magnetic flux when the phase currents IU1-IW2 determined by the above equation (eq1) flow respectively through the phase windings U1-W2 is designated by φ4+.

Figure 10:
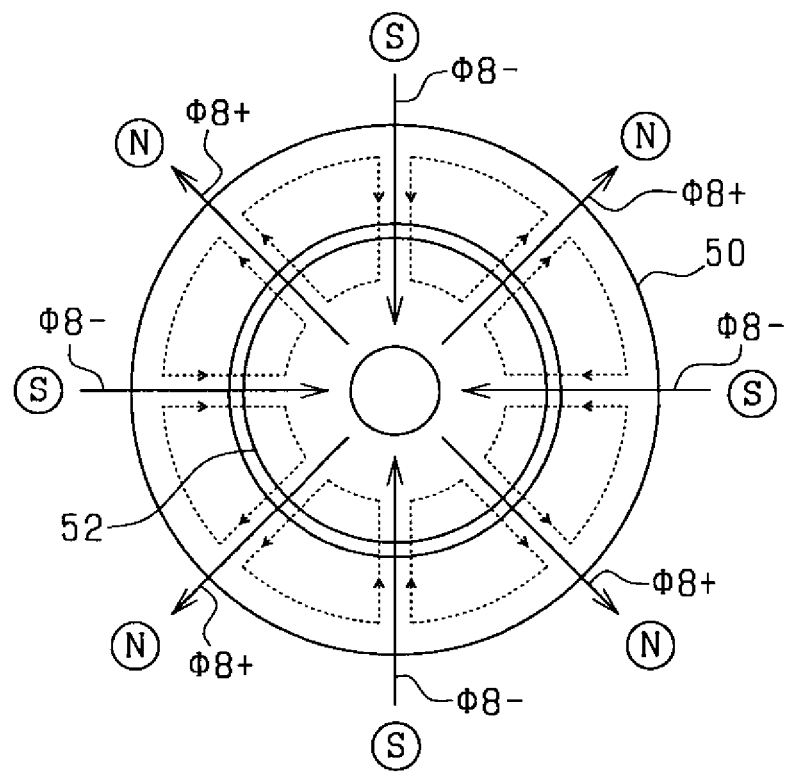
FIG. 10 is a schematic diagram illustrating magnetic flux paths formed in the pole-changing rotating electric machine in an 8-pole mode.

Otherwise, the control apparatus 30 performs 8-pole mode control to reverse the energization direction of one of the two winding portions in each of the multi-phase slots 56B. Consequently, the magnetomotive force distribution of the stator 50 becomes a magnetomotive force distribution corresponding to 8 poles. As a result, as shown in FIG. 10, N poles and S poles are alternately arranged at intervals of 45° in mechanical angle in the circumferential direction of the stator 50; the number of the N and S poles is equal to 8. In this case, the phase currents IU1-IW2, which can be determined by the following equation (eq2), flow respectively through the phase windings U1-W2.

In the following equation (eq2), $\omega 8c$ represents a second primary angular frequency which is a primary angular frequency corresponding to 8 poles, Im8 represents the phase-current amplitude, and $\alpha 8$ represents the phase-current phase. The second primary angular frequency $\omega 8c$ is set to be higher than the first primary angular frequency $\omega 4c$. More specifically, the second primary angular frequency $\omega 8c$ is set to be, for example, approximately twice the first primary angular frequency $\omega 4c$.

$$\left.\begin{array}{l} I_{U1} = I_{m8}\cos(\omega_{8c}t + \alpha_8) \\ I_{V1} = I_{m8}\cos(\omega_{8c}t + \alpha_8 - 2\pi/3) \\ I_{W1} = I_{m8}\cos(\omega_{8c}t + \alpha_8 + 2\pi/3) \\ I_{U2} = I_{m8}\cos(\omega_{8c}t + \alpha_8) \\ I_{V2} = I_{m8}\cos(\omega_{8c}t + \alpha_8 - 2\pi/3) \\ I_{W2} = I_{m8}\cos(\omega_{8c}t + \alpha_8 + 2\pi/3) \end{array}\right\} \quad (eq2)$$

In addition, in FIG. 10, the radially inward magnetic flux when the phase currents IU1-IW2 determined by the above equation (eq2) flow respectively through the phase windings U1-W2 is designated by $\varphi 8-$; the radially outward magnetic flux when the phase currents IU1-IW2 determined by the above equation (eq2) flow respectively through the phase windings U1-W2 is designated by $\varphi 8+$.

Next, torque control of the rotating electric machine 10, which includes the 4-pole mode control and the 8-pole mode control and is performed by the control apparatus 30, will be described with reference to FIG. 11.

Figure 11:
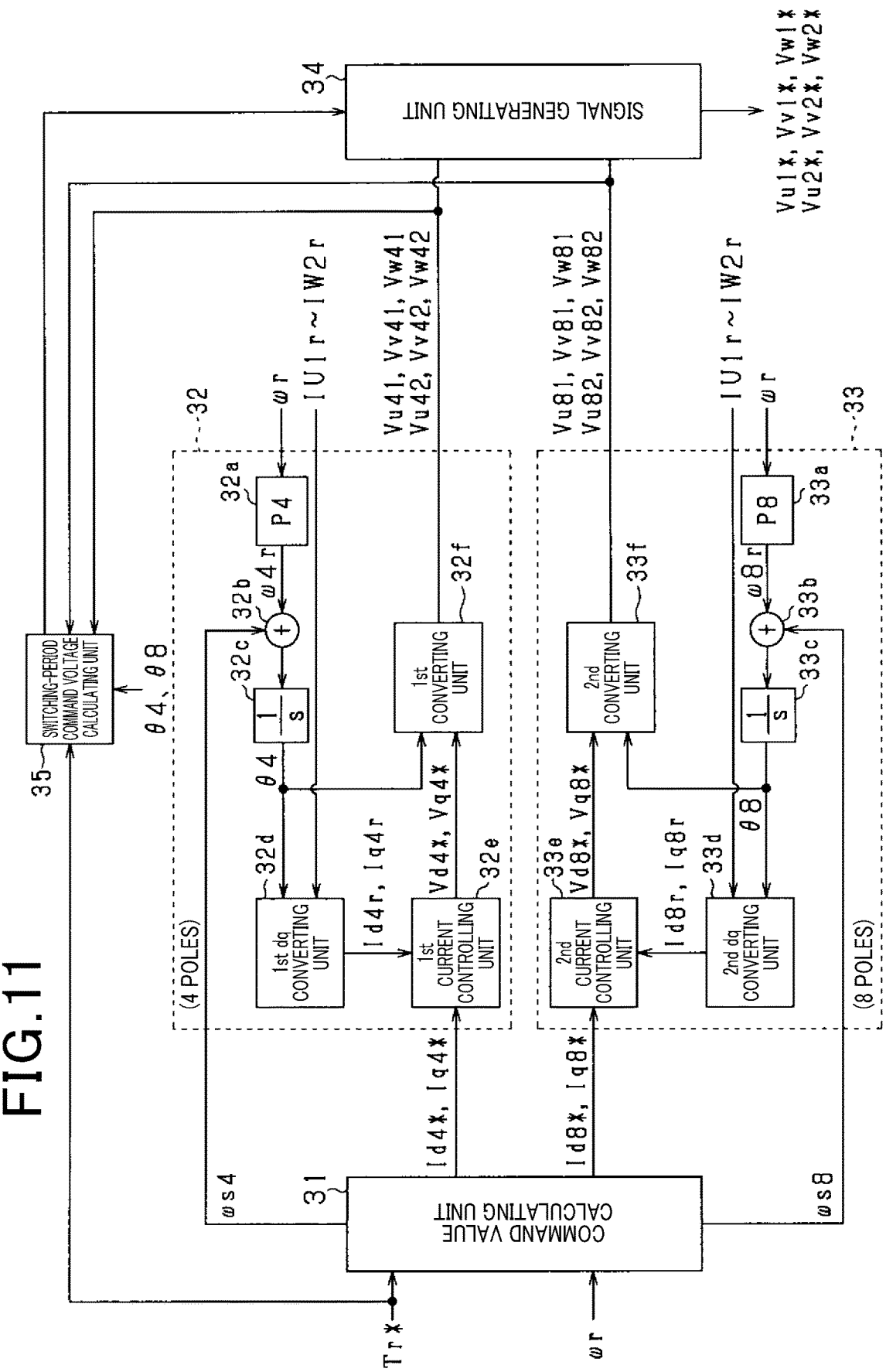
FIG. 11 is a functional block diagram illustrating the configuration of the control apparatus for controlling torque of the pole-changing rotating electric machine.

As shown in FIG. 11, the control apparatus 30 includes a command value calculating unit 31, a 4-pole control unit 32, an 8-pole control unit 33 and a signal generating unit 34.

The command value calculating unit 31 acquires the command total-torque Tr* inputted from the upper-level control apparatus. Then, based on the acquired command total-torque Tr* and the mechanical angular frequency $\omega r$ detected by the speed sensor 23, the command value calculating unit 31 calculates a first d-axis command current Id4*, a first q-axis command current Iq4*, a second d-axis command current Id8*, a second q-axis command current Iq8*, a first slip angular frequency $\omega s4$ which is a slip angular frequency corresponding to 4 poles, and a second slip angular frequency $\omega s8$ which is a slip angular frequency corresponding to 8 poles. The command value calculating unit 31 calculates the first d-axis command current Id4*, the first q-axis command current Iq4*, the second d-axis command current Id8* and the second q-axis command current Iq8* so that the sum of a command torque of the rotating electric machine 10 corresponding to 4 poles and a command torque of the rotating electrical machine 10 corresponding to 8 poles becomes equal to the command total-torque Tr*. Here, the command torque of the rotating electric machine 10 corresponding to 4 poles is determined by the first d-axis command current Id4* and the first q-axis command current Iq4*, while the command torque of the rotating electrical machine 10 corresponding to 8 poles is determined by the second d-axis command current Id8* and the second q-axis command current Iq8*.

The 4-pole control unit 32 corresponds to a current control system of the rotating electric machine 10 when the number of poles of the rotating electric machine 10 is set to 4. In contrast, the 8-pole control unit 33 corresponds to a current control system of the rotating electric machine 10 when the number of poles of the rotating electric machine 10 is set to 8.

In the 4-pole control unit 32, a first frequency calculating unit 32a calculates, based on the mechanical angular frequency $\omega r$ and the number of poles P4 (i.e., 4), a first electrical angular frequency $\omega 4r$ which is an electrical angular frequency of the rotating electric machine 10 corresponding to 4 poles.

A first adding unit 32b adds the first slip angular frequency $\omega s4$ calculated by the command value calculating unit 31 to the first electrical angular frequency $\omega 4r$ calculated by the first frequency calculating unit 32a and outputs the result which represents the first primary angular frequency $\omega 4c$. The first primary angular frequency $\omega 4c$ is the rotational angular frequency of the output voltage vectors of the inverter 20. The dq coordinate system corresponding to 4 poles rotates at the first primary angular frequency $\omega 4c$.

A first angle calculating unit 32c calculates the first electrical angle $\theta 4$ by integrating the output value of the first adding unit 32b.

A first dq converting unit 32d converts, based on the first electrical angle $\theta 4$, the phase currents IU1r-IW2r detected by the current sensor 22 into the first d-axis current Id4r and the first q-axis current Iq4r in the dq coordinate system corresponding to 4 poles. Here, the d-axis current is an excitation current for generating a secondary magnetic flux while the q-axis current is a torque current. In addition, the conversion in the first dq converting unit 32d may be performed by, for example, the following equation (eq3). The first transformation matrix C1 on the right side of the following equation (eq3) is a matrix that depends on the first electrical angle $\theta 4$.

$$\begin{bmatrix} I_{d4r} \\ I_{q4r} \end{bmatrix} = C_1 \begin{bmatrix} I_{U1r} \\ I_{V1r} \\ I_{W1r} \\ I_{U2r} \\ I_{V2r} \\ I_{W2r} \end{bmatrix} \quad (eq3)$$

A first current controlling unit 32e calculates a first d-axis command voltage Vd4* on the d axis as a manipulated variable for feedback-controlling the first d-axis current Id4r converted by the first dq converting unit 32d to the first d-axis command current Id4* calculated by the command value calculating unit 31. Moreover, the first current controlling unit 32e also calculates the first q-axis command voltage Vq4* on the q-axis as a manipulated variable for feedback-controlling the first q-axis current Iq4r converted by the first dq converting unit 32d to the first q-axis command current Iq4* calculated by the command value calculating unit 31. In addition, the feedback control used in the first current controlling unit 32e may be, for example, proportional integral control.

A first converting unit 32f calculates, based on the first d and q command voltages Vd4* and Vq4* calculated by the first current controlling unit 32e and the first electrical angle θ4 calculated by the first angle calculating unit 32c, first U-phase, first V-phase and first W-phase command voltages Vu41, Vv41 and Vw41 corresponding to 4 poles and second U-phase, second V-phase and second W-phase command voltages Vu42, Vv42 and Vw42 corresponding to 4 poles. In addition, the conversion in the first converting unit 32f may be performed by, for example, the following equation (eq4). The second transformation matrix C2 on the right side of the following equation (eq4) is a matrix that depends on the first electrical angle θ4.

$$\begin{bmatrix} V_{u41} \\ V_{v41} \\ V_{w41} \\ V_{u42} \\ V_{v42} \\ V_{w42} \end{bmatrix} = C_2 \begin{bmatrix} V_{d4}^* \\ V_{d4}^* \end{bmatrix} \quad (eq4)$$

In the present embodiment, the command voltage of each phase calculated by the first converting unit 32f is represented by the following equation (eq5), where Vm4 represents the amplitude of the command voltage, t represents time, and σ4 represents the phase of the command voltage.

$$\begin{aligned} V_{u41} &= V_{m4}\cos(\omega_{4c}t + \sigma_4) \\ V_{v41} &= V_{m4}\cos(\omega_{4c}t + \sigma_4 + 2\pi/3) \\ V_{w41} &= V_{m4}\cos(\omega_{4c}t + \sigma_4 - 2\pi/3) \\ V_{u42} &= -V_{m4}\cos(\omega_{4c}t + \sigma_4) \\ V_{v42} &= -V_{m4}\cos(\omega_{4c}t + \alpha_4 + 2\pi/3) \\ V_{w42} &= -V_{m4}\cos(\omega_{4c}t + \alpha_4 - 2\pi/3) \end{aligned} \quad (eq5)$$

When 4 poles are selected, the signal generating unit 34 sets the first U-phase, first V-phase and first W-phase command voltages Vu1*, Vv1* and Vw1* and the second U-phase, second V-phase and second W-phase command voltages Vu2*, Vv2* and Vw2* as shown in the following equation (eq6).

$$V_{u1}^*=V_{u41}, V_{v1}^*=V_{v41}, V_{w1}^*=V_{w41}, V_{u2}^*=V_{u42}, V_{v2}^*=V_{v42}, V_{w2}^*=V_{w42} \quad (eq6)$$

Then, the inverter 20 is operated to apply the command voltages Vu1*, Vv1*, Vw1*, Vu2*, Vv2* and Vw2* set as shown in the above (eq6) respectively to the phase windings U1, V1, W1, U2, V2 and W2. Consequently, the phase currents IU1-IW2 determined by the above equation (eq1) flow respectively through the phase windings U1-W2.

On the other hand, a second frequency calculating unit 33a calculates, based on the mechanical angular frequency ωr and the number of poles P8 (i.e., 8), a second electrical angular frequency ω8r which is an electrical angular frequency of the rotating electric machine 10 corresponding to 8 poles.

A second adding unit 33b adds the second slip angular frequency ωs8 calculated by the command value calculating unit 31 to the first electrical angular frequency ω8r calculated by the second frequency calculating unit 33a and outputs the result which represents the second primary angular frequency ω8c. The dq coordinate system corresponding to 8 poles rotates at the second primary angular frequency ω8c.

A second angle calculating unit 33c calculates the second electrical angle θ8 by integrating the output value of the second adding unit 33b.

A second dq converting unit 33d converts, based on the second electrical angle θ8, the phase currents IU1r-IW2r detected by the current sensor 22 into a second d-axis current Id8r and a second q-axis current Iq8r in the dq coordinate system corresponding to 8 poles. In addition, the conversion in the first dq converting unit 33d may be performed, for example, by the following equation (eq7). The third transformation matrix C3 on the right side of the following equation (eq7) is a matrix that depends on the second electrical angle θ8.

$$\begin{bmatrix} I_{d8r} \\ I_{q8r} \end{bmatrix} = C_3 \begin{bmatrix} I_{U1r} \\ I_{V1r} \\ I_{W1r} \\ I_{U2r} \\ I_{V2r} \\ I_{W2r} \end{bmatrix} \quad (eq7)$$

A second current controlling unit 33e calculates a second d-axis command voltage Vd8* on the d axis as a manipulated variable for feedback-controlling the second d-axis current Id8r converted by the second dq converting unit 33d to the second d-axis command current Id8* calculated by the command value calculating unit 31. Moreover, the second current controlling unit 33e also calculates the second q-axis command voltage Vq8* on the q-axis as a manipulated variable for feedback-controlling the second q-axis current Iq8r converted by the second dq converting unit 33d to the second q-axis command current Iq8* calculated by the command value calculating unit 31. In addition, the feedback control used in the second current controlling unit 33e may be, for example, proportional integral control.

A second converting unit 33f calculates, based the second d and q command voltages Vd8* and Vq8* calculated by the second current controlling unit 33e and the second electrical angle θ8 calculated by the second angle calculating unit 33c, first U-phase, first V-phase and first W-phase command voltages Vu81, Vv81 and Vw81 corresponding to 8 poles and second U-phase, second V-phase and second W-phase command voltages Vu82, Vv82 and Vw82 corresponding to 8 poles. In addition, the conversion in the second converting unit 33f may be performed, for example, the following equation (eq8). The fourth transformation matrix C4 on the right side of the following equation (eq8) is a matrix that depends on the second electrical angle θ8.

$$\begin{bmatrix} V_{u81} \\ V_{v81} \\ V_{w81} \\ V_{u82} \\ V_{v82} \\ V_{w82} \end{bmatrix} = C_4 \begin{bmatrix} V_{d8}^* \\ V_{q8}^* \end{bmatrix} \quad (eq8)$$

In the present embodiment, the command voltage of each phase calculated by the second converting unit 33f is represented by the following equation (eq9), where Vm8 represents the amplitude of the command voltage, t represents time, and σ8 represents the phase of the command voltage.

$$\left.\begin{aligned}V_{u81} &= V_{m8}\cos(\omega_8 t + \sigma_8) \\ V_{v81} &= V_{m8}\cos(\omega_8 t + \sigma_8 - 2\pi/3) \\ V_{w81} &= V_{m8}\cos(\omega_8 t + \sigma_8 + 2\pi/3) \\ V_{u82} &= V_{m8}\cos(\omega_8 t + \sigma_8) \\ V_{v82} &= V_{m8}\cos(\omega_8 t + \sigma_8 - 2\pi/3) \\ V_{w82} &= V_{m8}\cos(\omega_8 t + \sigma_8 + 2\pi/3)\end{aligned}\right\} \quad (eq9)$$

When 8 poles are selected, the signal generating unit 34 sets the first U-phase, first V-phase and first W-phase command voltages Vu1*, Vv1* and Vw1* and the second U-phase, second V-phase and second W-phase command voltages Vu2*, Vv2* and Vw2* as shown in the following equation (eq10).

$$V_{u1}^* = V_{u84}, V_{v1}^* = V_{v81}, V_{w1}^* = V_{w81}, V_{u2}^* = V_{u82},\\ V_{v2}^* = V_{v82}, V_{w2}^* = V_{w82} \quad (eq10)$$

Then, the inverter 20 is operated to apply the command voltages Vu1*, Vv1*, Vw1*, Vu2*, Vv2* and Vw2* set as shown in the above equation (eq10) respectively to the phase windings U1, V1, W1, U2, V2 and W2. Consequently, the phase currents IU1-IW2 determined by the above equation (eq2) flow respectively through the phase windings U1-W2.

The control apparatus 30 selects, as the number of poles of the rotating electric machine 10, 8 upon determination that the mechanical angular frequency (or of the rotating electric machine 10 is equal to or lower than a threshold speed, and 4 upon determination that the mechanical angular frequency (or is higher than the threshold speed.

In addition, in the case of switching the number of poles of the rotating electric machine 10 from 4 to 8, the command torque determined by the first d-axis and q-axis command currents Id4* and Iq4* corresponds to a pre-switching command torque; the command torque determined by the second d-axis and q-axis command currents Id8* and Iq8* corresponds to the post-switching command torque. Moreover, in this case, the command value calculating unit 31, the 4-pole control unit 32 and the signal generating unit 34 together correspond to a pre-switching control unit; the command value calculating unit 31, the 8-pole control unit 33 and the signal generating unit 34 together correspond to a post-switching control unit.

Next, explanation will be made of the torque control performed during a pole-number switching period TC for which the number of poles of the rotating electric machine 10 is switched from one of 4 and 8 to the other.

During the pole-number switching period TC, the command value calculating unit 31 calculates the command currents Id4*, Iq4*, Id8* and Iq8* so that the sum of the command torque determined by the first d-axis and q-axis command currents Id4* and Iq4* and the command torque determined by the second d-axis and q-axis command currents Id8* and Iq8* becomes equal to the command total-torque Tr*.

The control apparatus 30 includes a switching-period command voltage calculating unit 35. During the pole-number switching period TC, the switching-period command voltage calculating unit 35 calculates, based on the command voltages calculated by the first converting unit 32f and the second converting unit 33f, the first U-phase, first V-phase and first W-phase command voltages Vu1*, Vv1* and Vw1* and the second U-phase, second V-phase and second W-phase command voltages Vu2*, Vv2* and Vw2*; then, the switching-period command voltage calculating unit 35 outputs the calculated command voltages to the signal generating unit 34. In addition, in the present embodiment, the switching-period command voltage calculating unit 35 corresponds to a transition control unit.

First, the switching from 8 poles to 4 poles will be described.

The switching-period command voltage calculating unit 35 calculates the first U-phase, first V-phase and first W-phase command voltages Vu1*, Vv1* and Vw1* and the second U-phase, second V-phase and second W-phase command voltages Vu2*, Vv2* and Vw2* as shown in the following equation (eq11).

$$\left.\begin{aligned}V_{u1}^* &= V_{u81}(t) + V_{u41c}(t) \\ &= V_{m8}(t)\cos(\omega_8 t + \sigma_8) + V_{m4}(t)\cos\left\{\tfrac{1}{2}(\omega_8 t + \sigma_8 + \Delta\theta_{ph})\right\} \\ V_{v1}^* &= V_{v81}(t) + V_{v41c}(t) \\ &= V_{m8}(t)\cos(\omega_8 t + \sigma_8 - 2\pi/3) + \\ &\quad V_{m4}(t)\cos\left\{\tfrac{1}{2}(\omega_8 t + \sigma_8 - 2\pi/3 + \Delta\theta_{ph})\right\} \\ V_{w1}^* &= V_{w81}(t) + V_{w41c}(t) \\ &= V_{m8}(t)\cos(\omega_8 t + \sigma_8 + 2\pi/3) + \\ &\quad V_{m4}(t)\cos\left\{\tfrac{1}{2}(\omega_8 t + \sigma_8 + 2\pi/3 + \Delta\theta_{ph})\right\} \\ V_{u2}^* &= V_{u82}(t) + V_{u42c}(t) \\ &= V_{m8}(t)\cos(\omega_8 t + \sigma_8) - V_{m4}(t)\cos\left\{\tfrac{1}{2}(\omega_8 t + \sigma_8 + \Delta\theta_{ph})\right\} \\ V_{v2}^* &= V_{v82}(t) + V_{v42c}(t) \\ &= V_{m8}(t)\cos(\omega_8 t + \sigma_8 - 2\pi/3) - \\ &\quad V_{m4}(t)\cos\left\{\tfrac{1}{2}(\omega_8 t + \sigma_8 - 2\pi/3 + \Delta\theta_{ph})\right\} \\ V_{w2}^* &= V_{w82}(t) + V_{w42c}(t) \\ &= V_{m8}(t)\cos(\omega_8 t + \sigma_8 + 2\pi/3) - \\ &\quad V_{m4}(t)\cos\left\{\tfrac{1}{2}(\omega_8 t + \sigma_8 + 2\pi/3 + \Delta\theta_{ph})\right\}\end{aligned}\right\} \quad (eq11)$$

Figure 12:
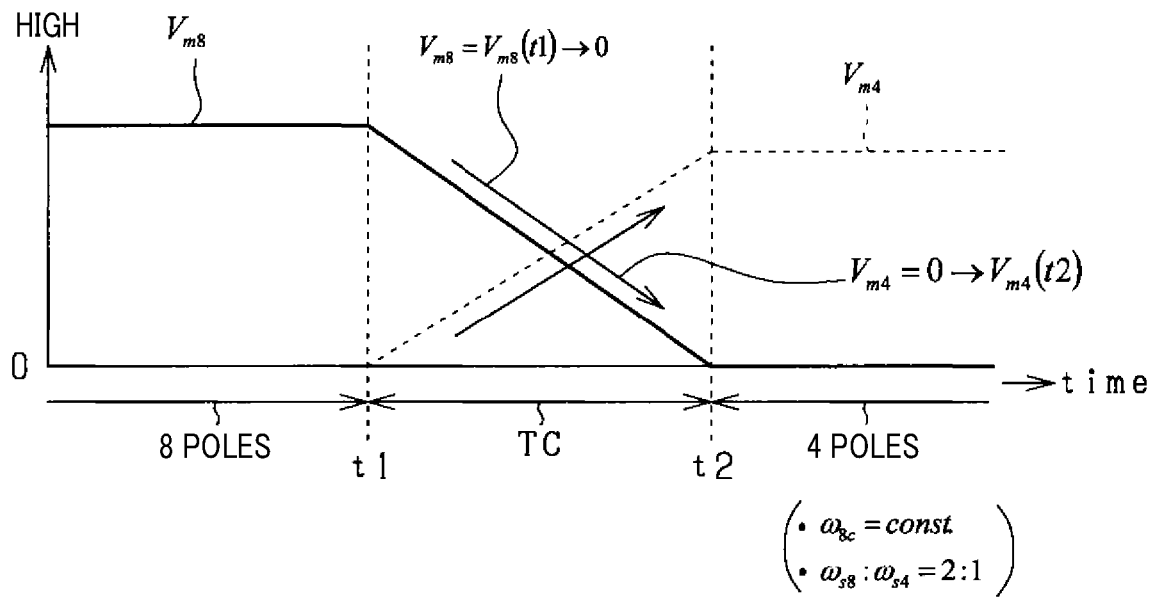
FIG. 12 is a time chart illustrating a pole-number switching process performed by the control apparatus.

In the above equation (eq11), Vu81(*t*), Vv81(*t*), Vw81(*t*), Vu82(*t*), Vv82(*t*) and Vw82(*t*) are basically the command voltages calculated by the second converting unit 33f. However, the amplitude Vm8(*t*) of Vu81(*t*)-Vw82(*t*) is gradually decreased to 0 during the pole-number switching period TC as shown in FIG. 12. More specifically, Vm8(*t*) is linearly decreased from Vm8(*t*1) at the start timing t1 of the pole-number switching period TC to 0 at the end timing t2 of the pole-number switching period TC. It should be noted that the manner of reduction of Vm8(*t*) is not limited to being linear.

Moreover, in the above equation (eq11), Vu41*c*(t), Vv41*c*(t), Vw41*c*(t), Vu42*c*(t), Vv42*c*(t) and Vw42*c*(t) are command voltages corresponding to 4 poles after the pole-number switching. The amplitude Vm4(*t*) of Vu41*c*(t)-Vw42*c*(t) is gradually increased from zero during the pole-number switching period TC as shown in FIG. 12. More specifically, Vm4(*t*) is linearly increased from 0 at the start timing t1 of the pole-number switching period TC to Vm4(*t*2) at the end timing t2 of the pole-number switching period TC. Consequently, during the pole-number switching period TC, the torque corresponding to 8 poles is gradually decreased to 0 while the torque corresponding to 4 poles is gradually increased to a value higher than 0. It should be noted that the manner of increase of Vm4(*t*) is not limited to being linear.

The second primary angular frequency ω8c in the above equation (eq11) is set to the second primary angular frequency ω8c calculated immediately before the processing cycle of the control apparatus 30 falls within the pole-number switching period TC. In the present embodiment, the second primary angular frequency ω8c is kept constant during the pole-number switching period TC. On the right side of the above equation (eq11), the angular frequency ω8c of the command voltages corresponding to 8 poles is set to be twice the angular frequency ω8c/2 of the command voltages corresponding to 4 poles. That is, the second primary angular frequency ω8c corresponding to 8 poles is set to be twice the first primary angular frequency ω4c corresponding to 4 poles.

Moreover, in the present embodiment, the spatial phase difference Δθph in the above equation (eq11) is set to 90° or −90°. The purpose of setting the second primary angular frequency ω8c to be twice the first primary angular frequency ω4c and setting the spatial phase difference Δθph to 90° or −90° is to suppress decrease in the torque generated by the rotating electric machine 10.

Figure 13:
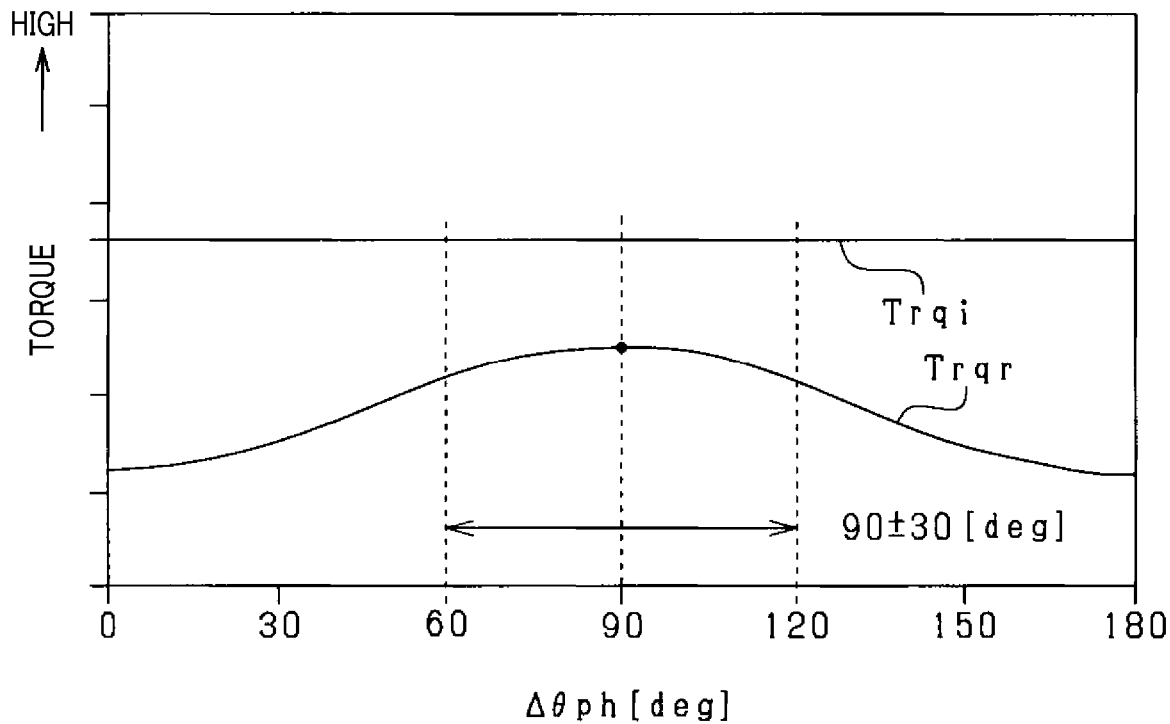
FIG. 13 is a graphical representation illustrating the relationship between torque generated by the pole-changing rotating electric machine and a spatial phase difference.
Figure 14:
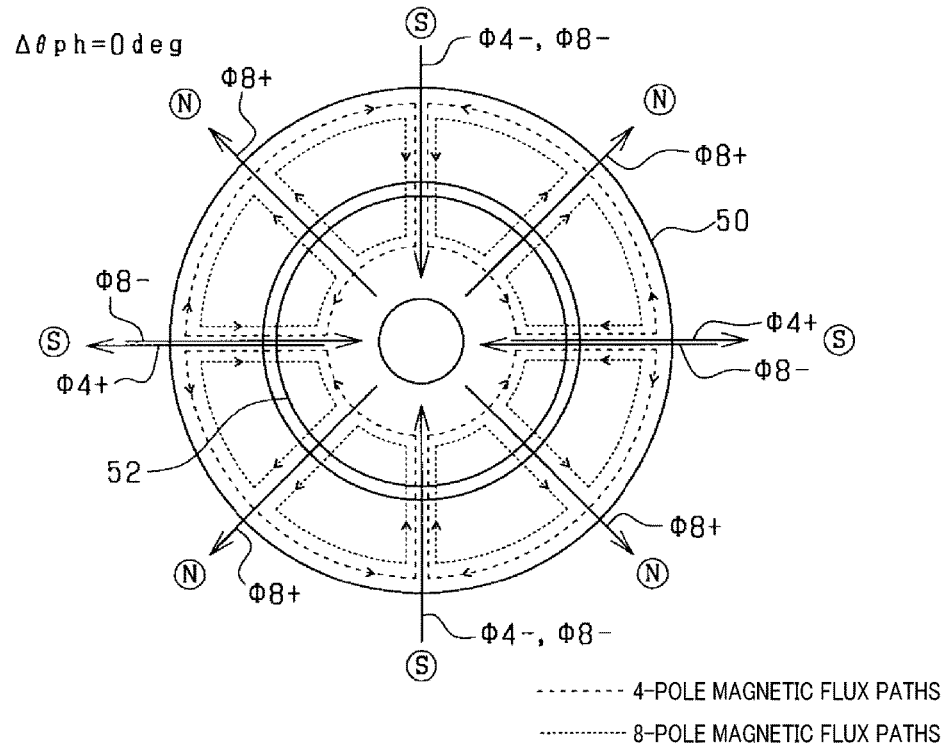
FIG. 14($a$) and FIG. 14($b$) are schematic diagrams illustrating magnetic flux paths formed in the pole-changing rotating electric machine during a pole-number switching period respectively in the case of the spatial phase difference being equal to 0° and in the case of the spatial phase difference being equal to 90°.
Figure 14:
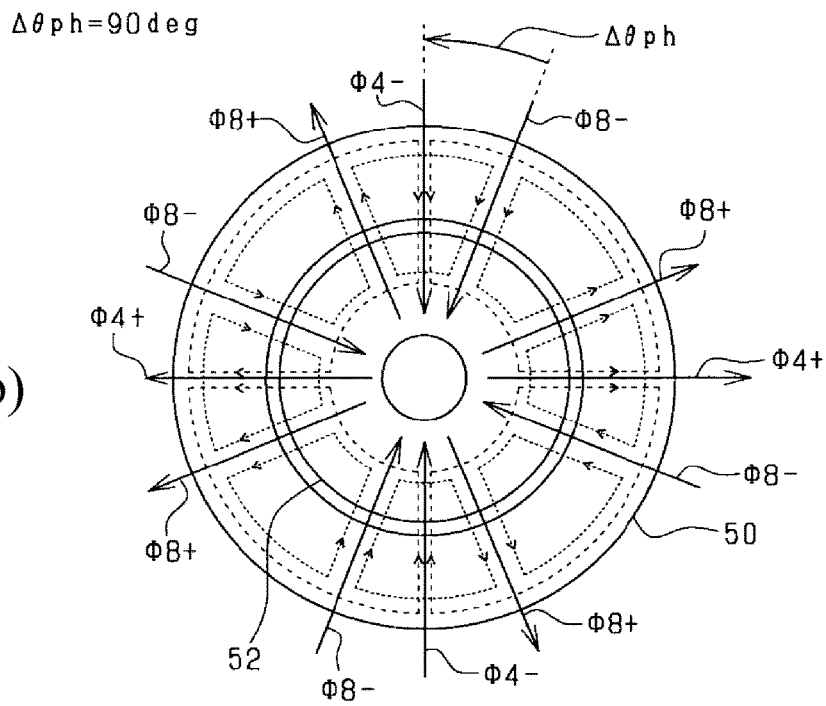

FIG. 13 illustrates the relationship between the torque Trqr generated by the rotating electric machine 10 and the spatial phase difference Δθph. Here, with an 8-pole magnetic flux vector being the reference, the spatial phase difference Δθph represents, as shown in FIG. 14(b), the difference in electrical angle between the 8-pole magnetic flux vector and a 4-pole magnetic flux vector having the same polarity as the 8-pole magnetic flux vector. More particularly, in FIG. 14(b), the spatial phase difference Δθph is shown as the difference in electrical angle between the 8-pole magnetic flux vector φ8− and the 4-pole magnetic flux vector φ4− with the 8-pole magnetic flux vector φ8− being the reference of the spatial phase difference Δθph.

As shown in FIG. 14(a), in the case of the spatial phase difference Δθph being equal to 0°, an N pole corresponding to 8 poles and an N pole corresponding to 4 poles coincide with each other in the circumferential direction of the stator 50. In this case, resultant magnetic flux, which is the resultant of the magnetic flux corresponding to 8 poles and the magnetic flux corresponding to 4 poles, flows through teeth 57B, causing magnetic saturation to occur in the rotating electric machine 10. Upon occurrence of the magnetic saturation, the torque Trqr generated by the rotating electric machine 10 becomes much lower than an ideal torque Trqi as shown in FIG. 13. The ideal torque Trqi is the sum of torque corresponding to 8 poles and torque corresponding to 4 poles.

As shown in FIG. 13, when the spatial phase difference Δθph is set to a value other than 0° or 180°, the amount of decrease in the torque generated by the rotating electric machine 10 is small. More particularly, as shown in FIG. 14(b), when the spatial phase difference Δθph is set to 90° or −90°, each N pole corresponding to 8 poles does not coincide with any N pole corresponding to 4 poles and each S pole corresponding to 8 poles does not coincide with any S pole corresponding to 4 poles. Consequently, the magnetic flux corresponding to 8 poles and the magnetic flux corresponding to 4 poles are distributed to suppress occurrence of magnetic saturation in the rotating electric machine 10, thereby suppressing reduction in the torque generated by the rotating electric machine 10. Incidentally, the spatial phase difference Δθph of 90° with 8 poles being the reference becomes 45° when 4 poles are taken as the reference instead.

To keep the spatial phase difference Δθph constant during the pole-number switching period TC, it is required that the angular frequency of the rotating magnetic flux corresponding to 8 poles be equal to the angular frequency of the rotating magnetic flux corresponding to 4 poles. To meet this requirement, the second primary angular frequency ω8c is set to be twice the first primary angular frequency ω4c. Here, setting the second primary angular frequency ω8c to be twice the first primary angular frequency ω4c is equivalent to setting the second slip angular frequency ωs8 to be twice the first slip angular frequency ωs4. The angular frequencies of the rotating magnetic fields can be expressed by the following equation (eq12), where ω4 cm represents the mechanical angular frequency of the rotating magnetic flux corresponding to 4 poles, ω8 cm represents the mechanical angular frequency of the rotating magnetic flux corresponding to 8 poles, Pm2 represents the number of pole pairs being equal to 2 in the case of 4 poles, and Pm4 represents the number of pole pairs being equal to 4 in the case of 8 poles.

$$\left.\begin{array}{l}\omega_{4cm} = \frac{1}{P_{m2}}(\omega_{4r} + \omega_{s4}) = \frac{1}{P_{m2}}(P_{m2} \cdot \omega_r + \omega_{s4}) \\ \omega_{8cm} = \frac{1}{P_{m4}}(\omega_{8r} + \omega_{s8}) = \frac{1}{P_{m4}}(P_{m4} \cdot \omega_r + \omega_{s8})\end{array}\right\} \quad (eq12)$$

With "ω4 cm=ω8 cm" and "Pm4/Pm2=2", the relationship of "ωs8:ωs4=2:1" is derived. Therefore, setting the second slip angular frequency ωs8 to be twice the first slip angular frequency ωs4, the spatial phase difference Δθph can be kept constant during the pole-number switching period TC.

During the pole-number switching period TC, the switching-period command voltage calculating unit 35 calculates the command voltages Vu1*, Vv1*, Vw1*, Vu2*, Vv2* and Vw2* as shown in the above equation (eq11) so as to make the directions of the 4-pole magnetic flux vectors and the directions of the 8-pole magnetic flux vectors not coincident with each other while maintaining the relationship of "ωs8:ωs4=2:1".

In addition, during the pole-number switching period TC, as shown in FIG. 13, the spatial phase difference Δθph, which is the difference between the directions of the 4-pole magnetic flux vectors and the directions of the 8-pole magnetic flux vectors, may be set within the range of +90±30° or within the range −90±30° with 8 poles being the reference of the spatial phase difference Δθph. Even with the spatial phase difference Δθph being not equal to 90° or −90°, it is still possible to suppress reduction in the torque in comparison with the case of the spatial phase difference Δθph being equal to 0°.

Moreover, during the pole-number switching period TC, the voltage vectors for 4 poles and 8 poles, which correspond to the controlled parameters, are controlled so that: the directions of the 4-pole voltage vectors determined by the first d-axis and q-axis command voltages Vd4* and Vq4* are different in phase by 90° from the directions of the 4-pole magnetic flux vectors; and the directions of the 8-pole voltage vectors determined by the second d-axis and q-axis command voltages Vd8* and Vq8* are different in phase by 90° from the directions of the 8-pole magnetic flux vectors. Here, the directions of the 4-pole voltage vectors and the directions of the 8-pole voltage vectors may be set within a range of 0±30° or within a range of 180±30° with 8 poles being the reference. This setting is based on the fact that the phase difference between the magnetic flux vectors and the voltage vectors is 90°.

In addition, the voltage phase difference between the 4-pole voltage vectors and the 8-pole voltage vectors can be operated by operating the current phase difference between the 4-pole current vectors determined by the first d-axis and q-axis command currents Id4* and Iq4* and the 8-pole current vectors determined by the second d-axis and q-axis command currents Id8* and Iq8*. This is derived from the voltage equations as shown in the following equations (eq13) and (eq14). The following equation (eq13) represents the voltage equation of the rotating electric machine 10 corresponding to 8 poles, and the following equation (eq14) represents the voltage equation of the rotating electric machine 10 corresponding to 4 poles. In addition, in the following equation (eq13), Rs8 represents the resistance of the stator coils, Ls8 represents the self-inductance of the stator coils, M8 represents the mutual inductance between the windings, Lr8 represents the self-inductance of the rotor coil in an equivalent circuit, Rr8 represents the resistance of the rotor coil in the equivalent circuit, Vds8 and Vqs8 represent the d-axis and q-axis voltages in the dq coordinate system for 8 poles, Ids8 and Iqs8 represent the d-axis and q-axis currents flowing through the stator coils in the dq coordinate system for 8 poles, and Idr8 and Iqr8 represent the d-axis and q-axis currents flowing in the rotor coil in the dq coordinate system for 8 poles.

$$\begin{bmatrix} V_{ds8} \\ V_{qs8} \\ 0 \\ 0 \end{bmatrix} = \begin{bmatrix} R_{s8}+s\cdot L_{s8} & -\omega_{8c}\cdot L_{s8} & s\cdot M_8 & -\omega_{8c}\cdot M_8 \\ \omega_{8c}\cdot L_{s8} & R_{s8}+s\cdot L_{s8} & \omega_{8c}\cdot M_8 & s\cdot M_8 \\ s\cdot M_8 & -(\omega_{8c}-\omega_{8r})M_8 & R_{r8}+s\cdot L_{r8} & -(\omega_{8c}-\omega_{8r})L_{r8} \\ (\omega_{8c}-\omega_{8r})M_8 & s\cdot M_8 & (\omega_{8c}-\omega_{8r})L_{r8} & R_{r8}+s\cdot L_{r8} \end{bmatrix} \begin{bmatrix} I_{ds8} \\ I_{qs8} \\ I_{dr8} \\ I_{qr8} \end{bmatrix}$$

(eq13)

$$\begin{bmatrix} V_{ds4} \\ V_{qs4} \\ 0 \\ 0 \end{bmatrix} = \begin{bmatrix} R_{s4}+s\cdot L_{s4} & -\omega_{4c}\cdot L_{s4} & s\cdot M_4 & -\omega_{4c}\cdot M_4 \\ \omega_{4c}\cdot L_{s4} & R_{s4}+s\cdot L_{s4} & \omega_{4c}\cdot M_4 & s\cdot M_4 \\ s\cdot M_4 & -(\omega_{4c}-\omega_{4r})M_4 & R_{r4}+s\cdot L_{r4} & -(\omega_{4c}-\omega_{4r})L_{r4} \\ (\omega_{4c}-\omega_{4r})M_4 & s\cdot M_4 & (\omega_{4c}-\omega_{4r})L_{r4} & R_{r4}+s\cdot L_{r4} \end{bmatrix} \begin{bmatrix} I_{ds4} \\ I_{qs4} \\ I_{dr4} \\ I_{qr4} \end{bmatrix}$$

(eq14)

By operating the voltage phase difference between the 4-pole voltage vectors and the 8-pole voltage vectors, the spatial phase difference Δθph, which is the phase difference between the 4-pole magnetic flux vectors and the 8-pole magnetic flux vectors, can be operated. This is derived from Faraday's law of electromagnetic induction, according to which there is a phase offset of 90° between the interlinkage magnetic flux and the voltage.

As above, the voltage phase difference can be operated by operating the current phase difference, and the spatial phase difference Δθph can be operated by operating the voltage phase difference. Therefore, the spatial phase difference Δθph can be operated by operating the current phase difference.

Next, the switching from 4 poles to 8 poles will be described.

The switching-period command voltage calculating unit 35 calculates the first U-phase, first V-phase and first W-phase command voltages Vu1*, Vv1* and Vw1* and the second U-phase, second V-phase and second W-phase command voltages Vu2*, Vv2* and Vw2* as in the following equation (eq15).

$$\begin{aligned}
V_{u1}^* &= V_{u41}(t) + V_{u81c}(t) \\
&= V_{m4}(t)\cos(\omega_{4c}t+\sigma_4) + V_{m8}(t)\cos\{2(\omega_{4c}t+\sigma_4)+\Delta\theta_{ph}\} \\
V_{v1}^* &= V_{v41}(t) + V_{v81c}(t) \\
&= V_{m4}(t)\cos(\omega_{4c}t+\sigma_4+2\pi/3) + \\
&\quad V_{m8}(t)\cos\{2(\omega_{4c}t+\sigma_4+2\pi/3)+\Delta\theta_{ph}\} \\
V_{w1}^* &= V_{w41}(t) + V_{w81c}(t) \\
&= V_{m4}(t)\cos(\omega_{4c}t+\sigma_4-2\pi/3) + \\
&\quad V_{m8}(t)\cos\{2(\omega_{4c}t+\sigma_4-2\pi/3)+\Delta\theta_{ph}\} \\
V_{u2}^* &= V_{u42}(t) + V_{u82c}(t) \\
&= -V_{m4}(t)\cos(\omega_{4c}t+\sigma_4) + V_{m8}(t)\cos\{2(\omega_{4c}t+\sigma_4)+\Delta\theta_{ph}\} \\
V_{v2}^* &= V_{v42}(t) + V_{v82c}(t) \\
&= -V_{m4}(t)\cos(\omega_{4c}t+\sigma_4+2\pi/3) + \\
&\quad V_{m8}(t)\cos\{2(\omega_{4c}t+\sigma_4+2\pi/3)+\Delta\theta_{ph}\} \\
V_{w2}^* &= V_{w42}(t) + V_{w82c}(t) \\
&= -V_{m4}(t)\cos(\omega_{4c}t+\sigma_4-2\pi/3) + \\
&\quad V_{m8}(t)\cos\{2(\omega_{4c}t+\sigma_4-2\pi/3)+\Delta\theta_{ph}\}
\end{aligned}$$

(eq15)

In the above equation (eq15), Vu41(t), Vv41(t), Vw41(t), Vu42(t), Vv42(t) and Vw42(t) are basically the command voltages calculated by the first converting unit 32f. However, the amplitude Vm4(t) of Vu41(t)-Vw42(t) is gradually decreased to 0 during the pole-number switching period TC. More specifically, Vm4(t) is linearly decreased from Vm4(t1) at the start timing t1 of the pole-number switching period TC to 0 at the end timing t2 of the pole-number switching period TC.

In the above equation (eq15), Vu81c(t), Vv81c(t), Vw81c(t), Vu82c(t), Vv82c(t) and Vw82c(t) are command voltages corresponding to 8 poles after the pole-number switching. The amplitude Vm8(t) of Vu81c(t)-Vw82c(t) is gradually increased from zero during the pole-number switching period TC. More specifically, Vm8(t) is linearly increased from 0 at the start timing t1 of the pole-number switching period TC to Vm8(t2) at the end timing t2 of the pole-number switching period TC. Consequently, during the pole-number switching period TC, the command torque corresponding to 4 poles is gradually decreased to 0 while the command torque corresponding to 8 poles is gradually increased to a value higher than 0.

The first primary angular frequency ω4c in the above equation (eq15) is set to the first primary angular frequency ω4c calculated immediately before the processing cycle of the control apparatus 30 falls within the pole-number switching period TC. In the present embodiment, the first primary angular frequency ω4c is kept constant during the pole-number switching period TC. On the right side of the above equation (eq15), the angular frequency 2×ω4c of the command voltages corresponding to 8 poles is set to be twice the angular frequency ω4c of the command voltages corresponding to the 4 poles. That is, the second primary angular frequency ω8c corresponding to 8 poles is set to be twice the first primary angular frequency ω4c corresponding to 4 poles. Moreover, in the present embodiment, the spatial phase difference Δθph in the above equation (eq15) is set to 90° or −90°.

Figure 15:
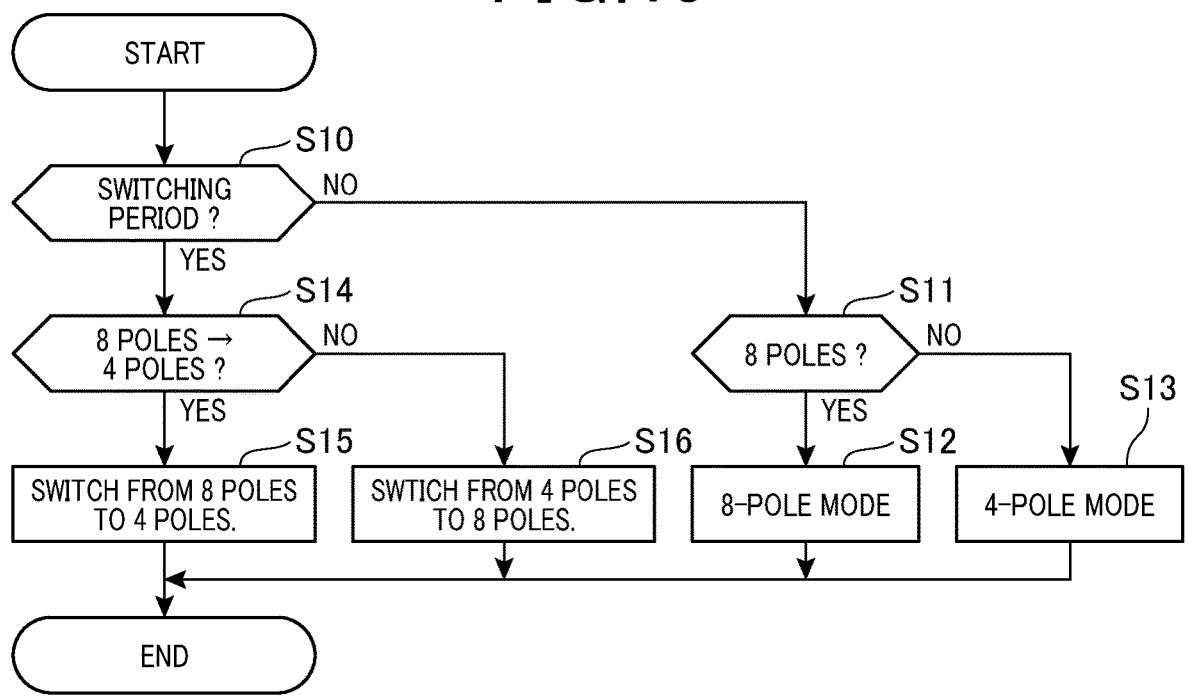
FIG. 15 is a flow chart illustrating a torque control process performed by the control apparatus.

FIG. 15 shows a torque control process according to the present embodiment. This process is repeatedly performed by the control apparatus 30 in each predetermined processing cycle.

First, in step S10, it is determined whether the current processing cycle is within the pole-number switching period TC.

If the determination in step S10 results in a "NO" answer, i.e., if the current processing cycle is not within the pole-number switching period TC, the process proceeds to step S11.

In step S11, it is further determined whether 8 has been selected as the number of poles of the rotating electric machine 10.

If the determination in step S11 results in a "YES" answer, i.e., if 8 has been selected as the number of poles of the rotating electric machine 10, the process proceeds to step S12, in which the 8-pole mode control is performed by the command value calculating unit 31, the 8-pole control unit 33 and the signal generating unit 34.

In contrast, if the determination in step S11 results in a "NO" answer, i.e., if 4 has been selected as the number of poles of the rotating electric machine 10, the process proceeds to step S13, in which the 4-pole mode control is performed by the command value calculating unit 31, the 4-pole control unit 32 and the signal generating unit 34.

On the other hand, if the determination in step S10 results in a "YES" answer, i.e., if the current processing cycle is within the pole-number switching period TC, the process proceeds to step S14.

In step S14, it is further determined whether the number of poles of the rotating electric machine 10 is being switched from 8 to 4.

If the determination in step S14 results in a "YES" answer, i.e., if the number of poles of the rotating electric machine 10 is being switched from 8 to 4, the process proceeds to step S15, in which the switching-period command voltage calculating unit 35 switches the number of poles from 8 to 4.

In contrast, if the determination in step S14 results in a "NO" answer, i.e., if the number of poles of the rotating electric machine 10 is being switched from 4 to 8, the process proceeds to step S16, in which the switching-period command voltage calculating unit 35 switches the number of poles from 4 to 8.

Figure 16:
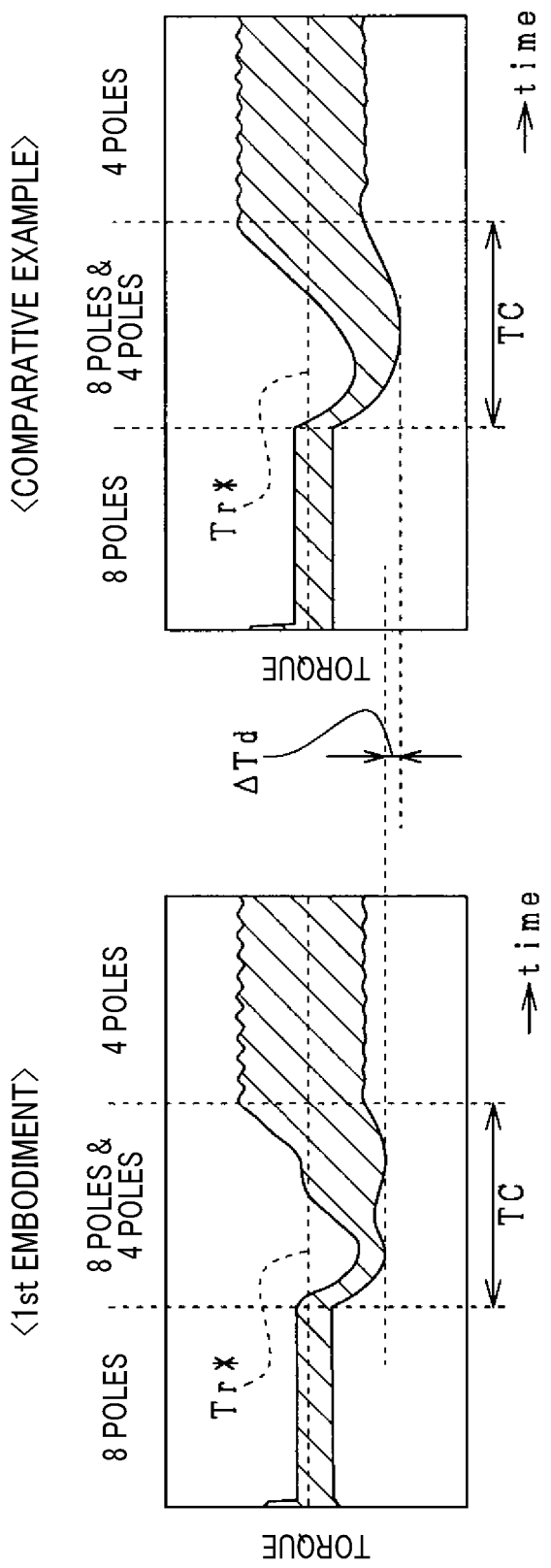
FIG. 16 is a schematic diagram illustrating the advantageous effects achievable according to the first embodiment over a comparative example.

FIG. 16 illustrates the advantageous effects achievable according to the present embodiment over a comparative example when switching the number of poles of the rotating electric machine 10 from 8 to 4. It should be noted that since the torque sampling cycle is very short, the waveform drawn by transition of the torque is shown by hatching in FIG. 16. Moreover, in the comparative example shown in FIG. 16, the relationship "$\omega s8:\omega s4=2:1$" is not maintained in the pole-number switching period TC.

As can be seen from FIG. 16, according to the present embodiment, reduction in the torque generated by the rotating electric machine 10 during the pole-number switching period TC is suppressed by $\Delta Td$ in comparison with the comparative example.

As described above, according to the present embodiment, the directions of the 4-pole magnetic flux vectors and the directions of the 8-pole magnetic flux vectors can be made not coincident with each other in the circumferential direction of the stator 50 during the pole-number switching period TC. Consequently, the magnetic flux corresponding to 4 poles and the magnetic flux corresponding to 8 poles can be distributed to suppress occurrence of magnetic saturation in the rotating electric machine 10. As a result, during the pole-number switching period TC, it is possible to suppress reduction in the torque generated by the rotating electric machine 10 due to magnetic saturation, thus suppressing decrease in the drivability of the vehicle.

Second Embodiment

According to the second embodiment, during the pole-number switching period TC, both the first primary angular frequency $\omega 4c$ and the second primary angular frequency $\omega 8c$ are changed while maintaining the relationship of "$\omega s8:\omega s4=2:1$". Consequently, increase in electric current flowing through each phase winding due to the pole-number switching is suppressed.

Figure 17:
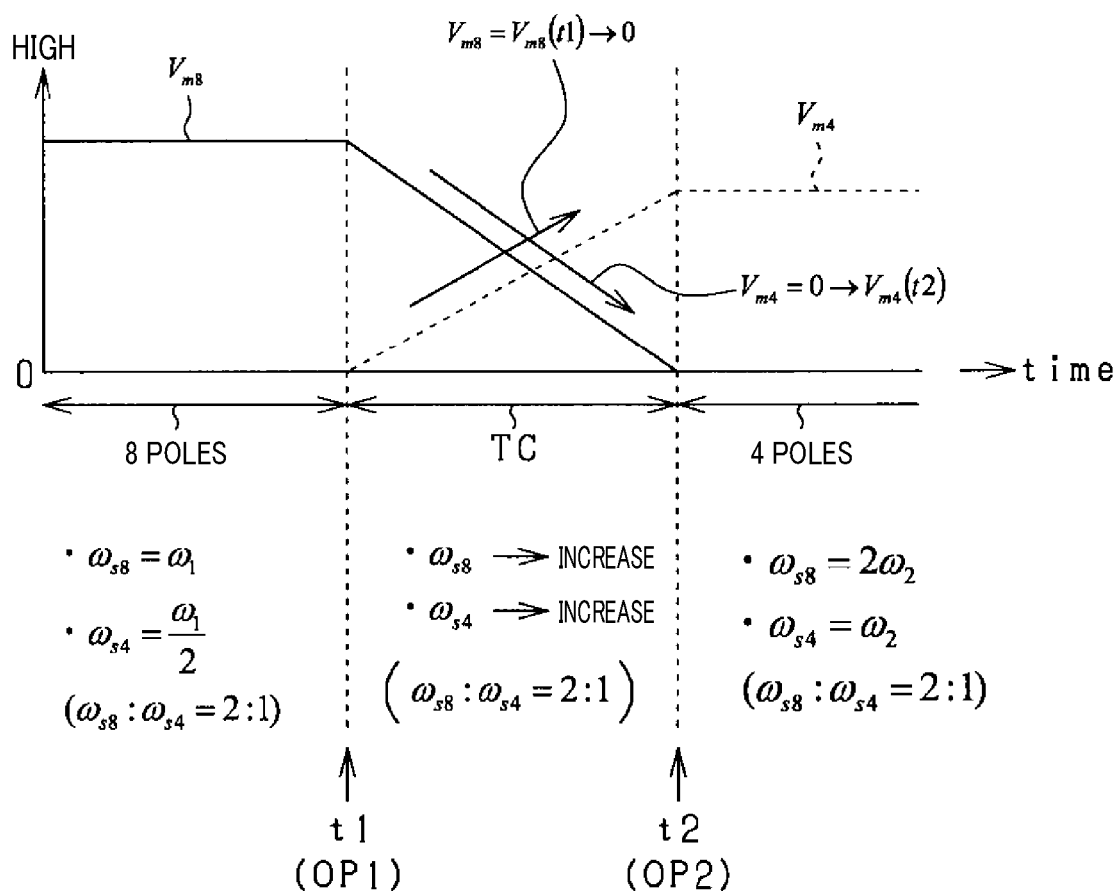
FIG. 17 is a time chart illustrating a pole-number switching process according to a second embodiment.

First, the switching from 8 poles to 4 poles according to the present embodiment will be described. As shown in FIG. 17, during the pole-number switching period TC, both the first slip angular frequency $\omega s4$ and the second slip angular frequency $\omega s8$ are increased while maintaining the relationship of "$\omega s8:\omega s4=2:1$".

Next, the switching from 4 poles to 8 poles according to the present embodiment will be described. Though not shown in the figures, during the pole-number switching period TC, both the first slip angular frequency $\omega s4$ and the second slip angular frequency $\omega s8$ are decreased while maintaining the relationship of "$\omega s8:\omega s4=2:1$".

A further explanation will be made of the switching from 8 poles to 4 poles according to the present embodiment with reference to FIG. 18(a) and FIG. 18(b).

Figure 18:
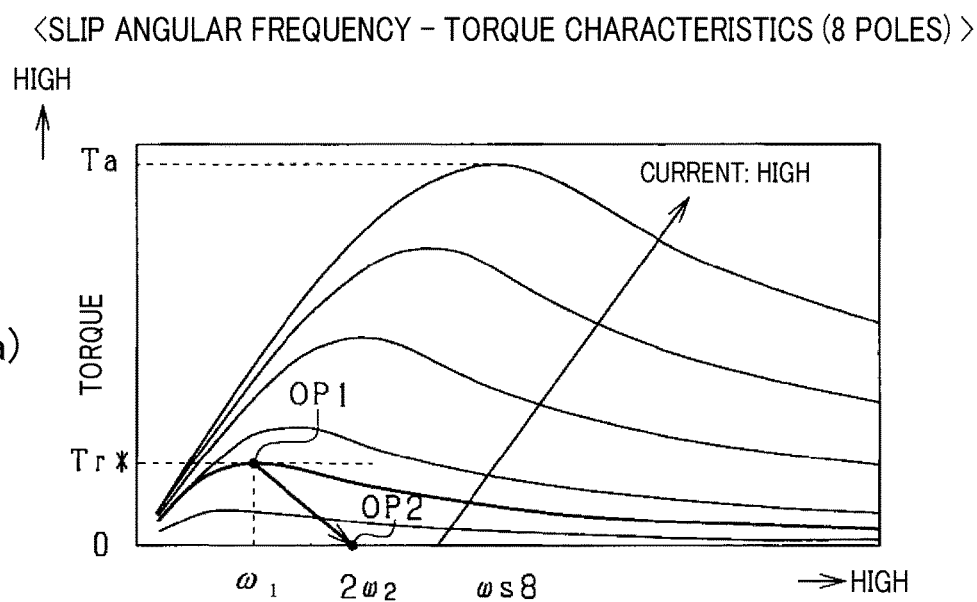
FIGS. 18($a$) and 18($b$) are graphical representations together illustrating the transition of the operating point of the pole-changing rotating electric machine during a pole-number switching period according to the second embodiment.
Figure 18:
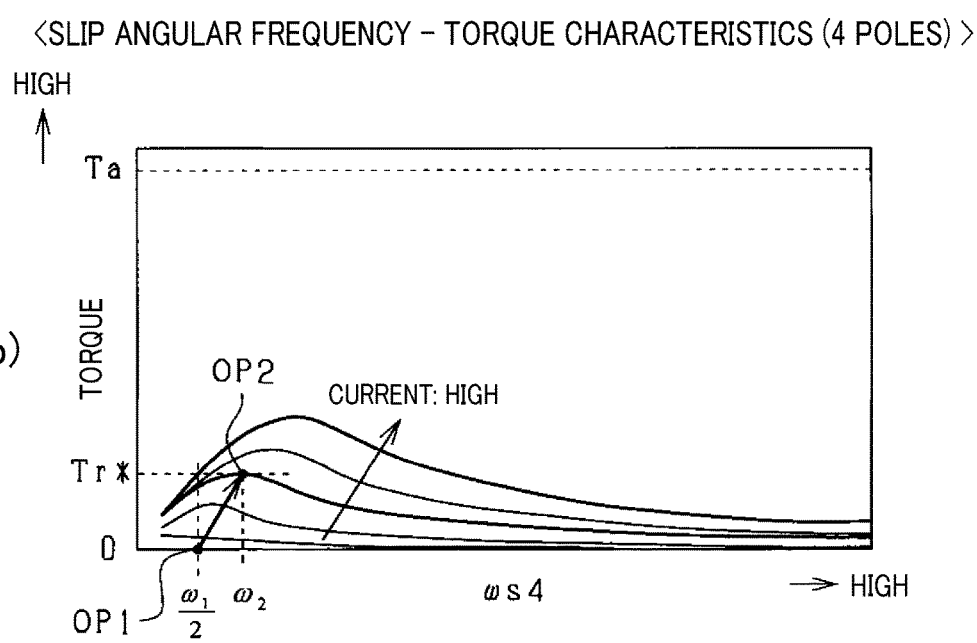

FIG. 18(a) shows the slip angular frequency and torque characteristics corresponding to 8 poles, and FIG. 18(b) shows the slip angular frequency and torque characteristics corresponding to 4 poles. In FIG. 18(a), when the magnitude of the current vectors determined by the d-axis and q-axis currents is kept at a constant value, the slip angular frequency at which the torque generated by the rotating electric machine 10 is highest becomes an 8-pole high-efficiency frequency that is an angular frequency corresponding to the minimum-current maximum-torque control. The 8-pole high-efficiency frequencies increase with the magnitude of the current vectors. Similarly, in FIG. 18(b), when the magnitude of the current vectors determined by the d-axis and q-axis currents is kept at a constant value, the slip angular frequency at which the torque generated by the rotating electric machine 10 is highest becomes a 4-pole high-efficiency frequency that is an angular frequency corresponding to the minimum-current maximum-torque control. The 4-pole high-efficiency frequencies increases with the magnitude of the current vectors.

In the present embodiment, the command torque corresponding to 4 poles, which is determined by the first d-axis and q-axis command currents Id4* and Iq4* set by the command value calculating unit 3, is a torque when the slip angular frequency becomes a 4-pole high-efficiency frequency. Similarly, the command torque corresponding to 8 poles, which is determined by the second d-axis and q-axis command currents Id8* and Iq8* set by the command value calculating unit 31, is a torque when the slip angular frequency becomes an 8-pole high-efficiency frequency.

In FIG. 18(a) and FIG. 18(b), the first operating point OP1, which is specified by both the torque generated by the rotating electric machine 10 and the slip angular frequency, is an operating point at the start timing t1 of the pole-number switching period TC. On the other hand, the second operating point OP2 is an operating point at the end timing t2 of the pole-number switching period TC.

Moreover, the first operating point OP1 is an operating point in FIG. 18(a) where the torque is equal to the command total-torque Tr* and the slip angular frequency is equal to an 8-pole high-efficiency frequency ω1, and is an operating point in FIG. 18(b) where the torque is equal to 0 and the slip angular frequency is ½ of the 8-pole high-efficiency frequency ω1. On the other hand, the second operating point OP2 is an operating point in FIG. 18(a) where the torque is equal to 0 and the slip angular frequency is twice a 4-pole high-efficiency frequency ω2, and is an operating point in FIG. 18(b) where the torque is equal to the command total-torque Tr* and the slip angular frequency is the 4-pole high-efficiency frequency ω2.

As can be seen from FIGS. 18(a) and 18(b), during the pole-number switching period TC for which the operating point of the rotating electric machine 10 is changed from the first operating point OP1 to the second operating point OP2, the relationship of "ωs8:ωs4=2:1" is maintained and both the first slip angular frequency ωs4 and the second slip angular frequency ωs8 are increased.

Figure 19A:
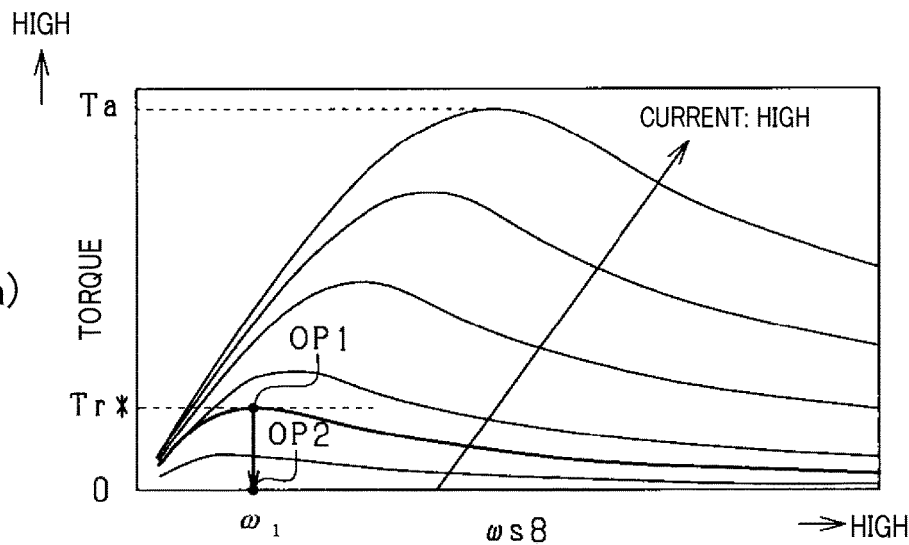
FIG. 19(a) and FIG. 19(b) are graphical representations together illustrating the transition of the operating point of the pole-changing rotating electric machine during a pole-number switching period according to a comparative example.
Figure 19B:
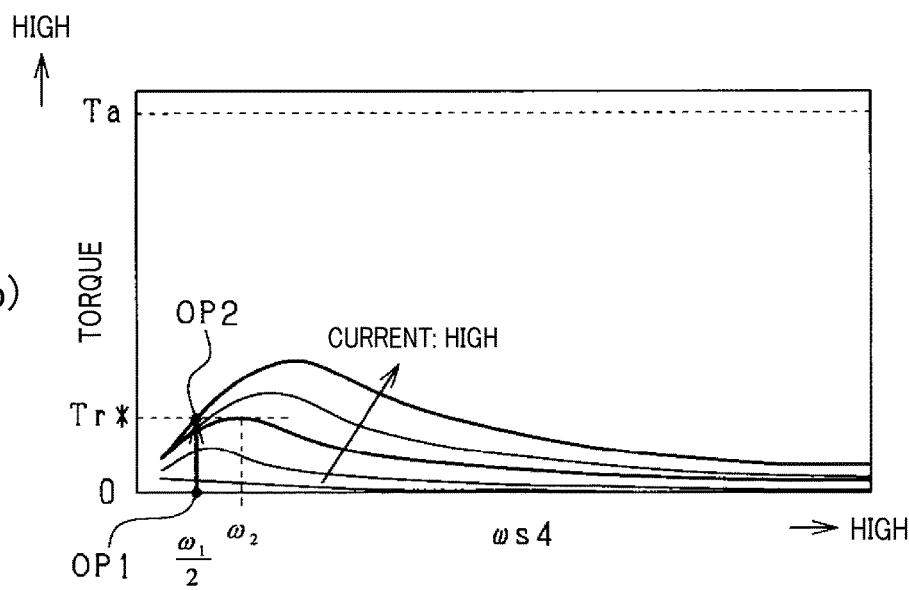

FIG. 19 illustrates the switching from 8 poles to 4 poles according to a comparative example. The characteristics in FIG. 19(a) and FIG. 19(b) are identical to those in FIGS. 18(a) and 18(b). Moreover, the first operating point OP1 in FIG. 19(a) and FIG. 19(b) is identical to that in FIGS. 18(a) and 18(b). On the other hand, the second operating point OP2 is an operating point in FIG. 19(a) where the torque is equal to 0 and the slip angular frequency is equal to the 8-pole high-efficiency frequency ω1, and is an operating point in FIG. 19(b) where the torque is equal to the command total-torque Tr* and the slip angular frequency is ½ of the 8-pole high-efficiency frequency ω1. In this comparative example, though the relationship of "ωs8:ωs4=2:1" is maintained during the pole-number switching period TC, with the transition of the operating point from the first operating point OP1 to the second operating point OP2, the magnitude of the current vectors required to generate the command total-torque Tr* becomes higher than that before the pole-number switching.

In contrast, according to the present embodiment, during the pole-number switching period TC, both the first primary angular frequency ω4c and the second primary angular frequency ω8c are changed while maintaining the relationship of "ωs8:ωs4=2:1". Consequently, increase in electric current flowing through each phase winding due to the pole-number switching is suppressed.

Third Embodiment

According to the third embodiment, the control is changed during the pole-number switching period TC.

Figure 20:
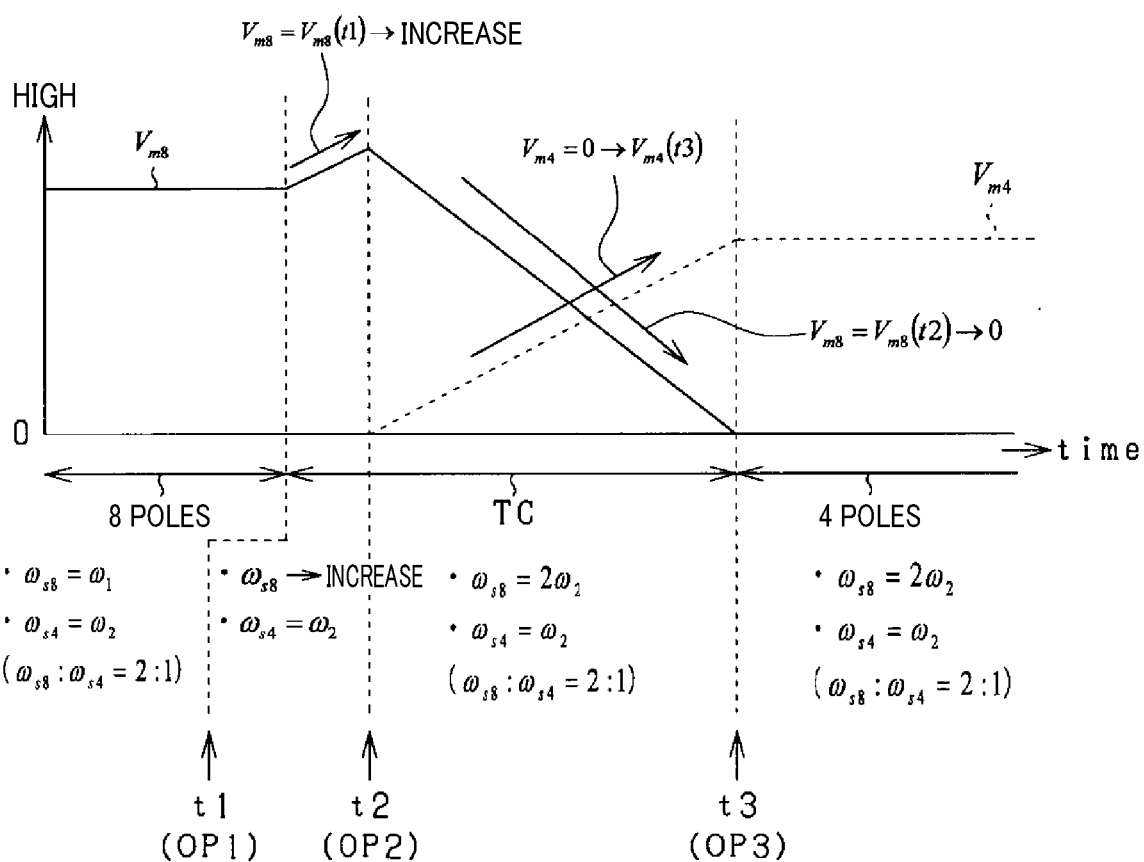
FIG. 20 is a time chart illustrating a pole-number switching process according to a third embodiment.

First, the switching from 8 poles to 4 poles according to the present embodiment will be described. As shown in FIG. 20, the first slip angular frequency ωs4 is kept at a constant value ω2 over the entire pole-number switching period TC. On the other hand, the second slip angular frequency ωs8 is first increased for a part of the pole-number switching period TC from a time instant t1 to a time instant t2, with the torque of the rotating electric machine 10 kept at the command total-torque Tr*, to a value (i.e., 2ω2) that is twice the first slip angular frequency ωs4. Then, for the remaining part of the pole-number switching period TC from the time instant t2 to a time instant t3, the second slip angular frequency ωs8 is kept constant at 2ω2 to maintain the relationship of "ωs8:ωs4=2:1". In addition, for the part of the pole-number switching period TC from the time instant t1 to the time instant t2, the amplitude Vm8 is increased to keep the torque of the rotating electric machine 10 at the command total-torque Tr*.

Next, the switching from 4 poles to 8 poles according to the present embodiment will be described. Though not shown in the figures, the second slip angular frequency ωs8 is kept at a constant value over the entire pole-number switching period TC. On the other hand, the first slip angular frequency ωs4 is first decreased for a part of the pole-number switching period TC, with the torque of the rotating electric machine 10 kept at the command total-torque Tr*, to a value that is ½ of the second slip angular frequency ωs8. Then, for the remaining part of the pole-number switching period TC, the first slip angular frequency ωs4 is kept constant at the value to maintain the relationship of "ωs8:ωs4=2:1".

Figure 21A:
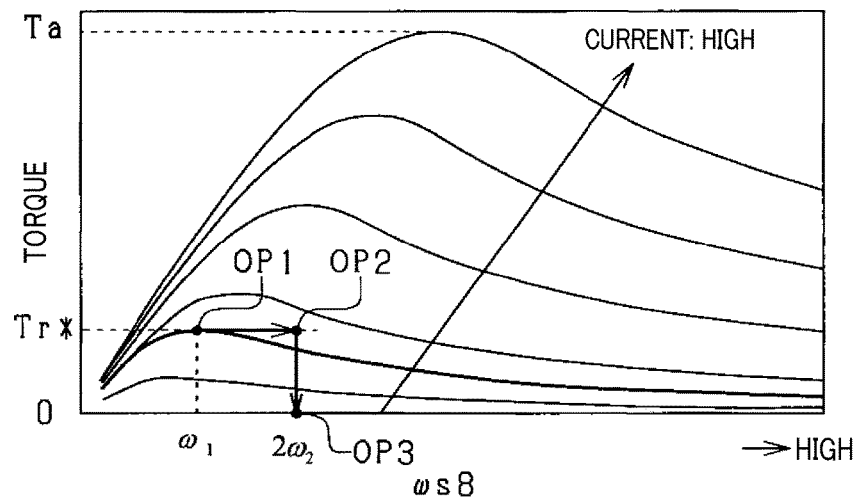
FIGS. 21(a) and 21(b) are graphical representations together illustrating the transition of the operating point of the pole-changing rotating electric machine during a pole-number switching period according to the third embodiment.
Figure 21B:
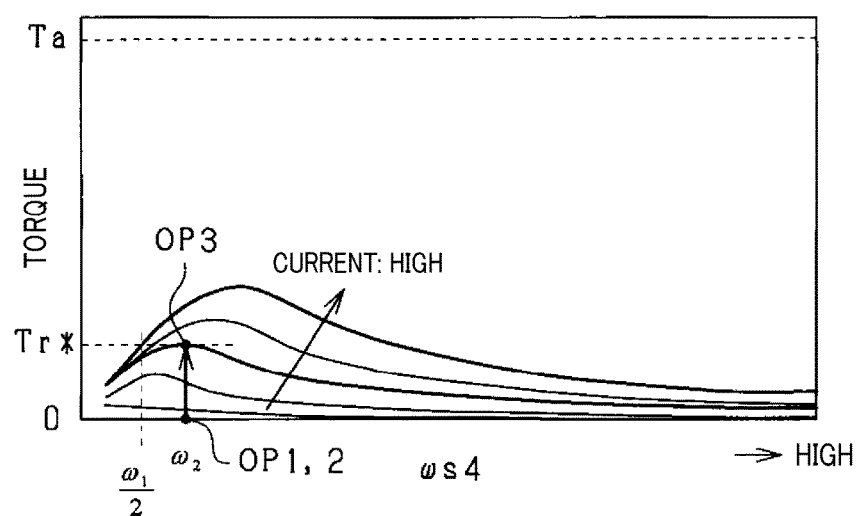

A further explanation will be made of the switching from 8 poles to 4 poles according to the present embodiment with reference to FIG. 21(a) and FIG. 21(b). The characteristics in FIG. 21(a) and FIG. 21(b) are identical to those in FIG. 18(a) and FIG. 18(b). Moreover, in FIGS. 20 and 21(a)-21(b), a first operating point OP1 is an operating point at the start timing t1 of the pole-number switching period TC. A second operating point OP2 is an operating point at the intermediate timing t2 of the pole-number switching period TC. A third operating point OP3 is an operating point at the end timing t3 of the pole-number switching period TC.

The first operating point OP1 is an operating point in FIG. 21(a) where the torque is equal to the command total-torque Tr* and the slip angular frequency is equal to the 8-pole high-efficiency frequency ω1, and is an operating point in FIG. 21(b) where the torque is equal to 0 and the slip angular frequency is equal to the 4-pole high-efficiency frequency ω2. The second operating point OP2 is an operating point in FIG. 21(a) where the torque is equal to the command total-torque Tr* and the slip angular frequency is twice the 4-pole high-efficiency frequency ω2, and is an operating point in FIG. 21(b) where the torque is equal to the command total-torque Tr* and the slip angular frequency is equal to the 4-pole high-efficiency frequency ω2. The third operating point OP3 is an operating point in FIG. 21(a) where the torque is equal to 0 and the slip angular frequency is twice the 4-pole high-efficiency frequency ω2, and is an operating point in FIG. 21(b) where the torque is equal to the command total-torque Tr* and the slip angular frequency is equal to the 4-pole high-efficiency frequency ω2.

According to the present embodiment, it is possible to achieve the same advantageous effects as achievable according to the second embodiment, i.e., it is possible to suppress increase in electric current flowing through each phase winding due to the pole-number switching.

While the above particular embodiments have been shown and described, it will be understood by those skilled in the art that various modifications, changes, and improvements may be made without departing from the spirit of the present disclosure.

Figure 22:
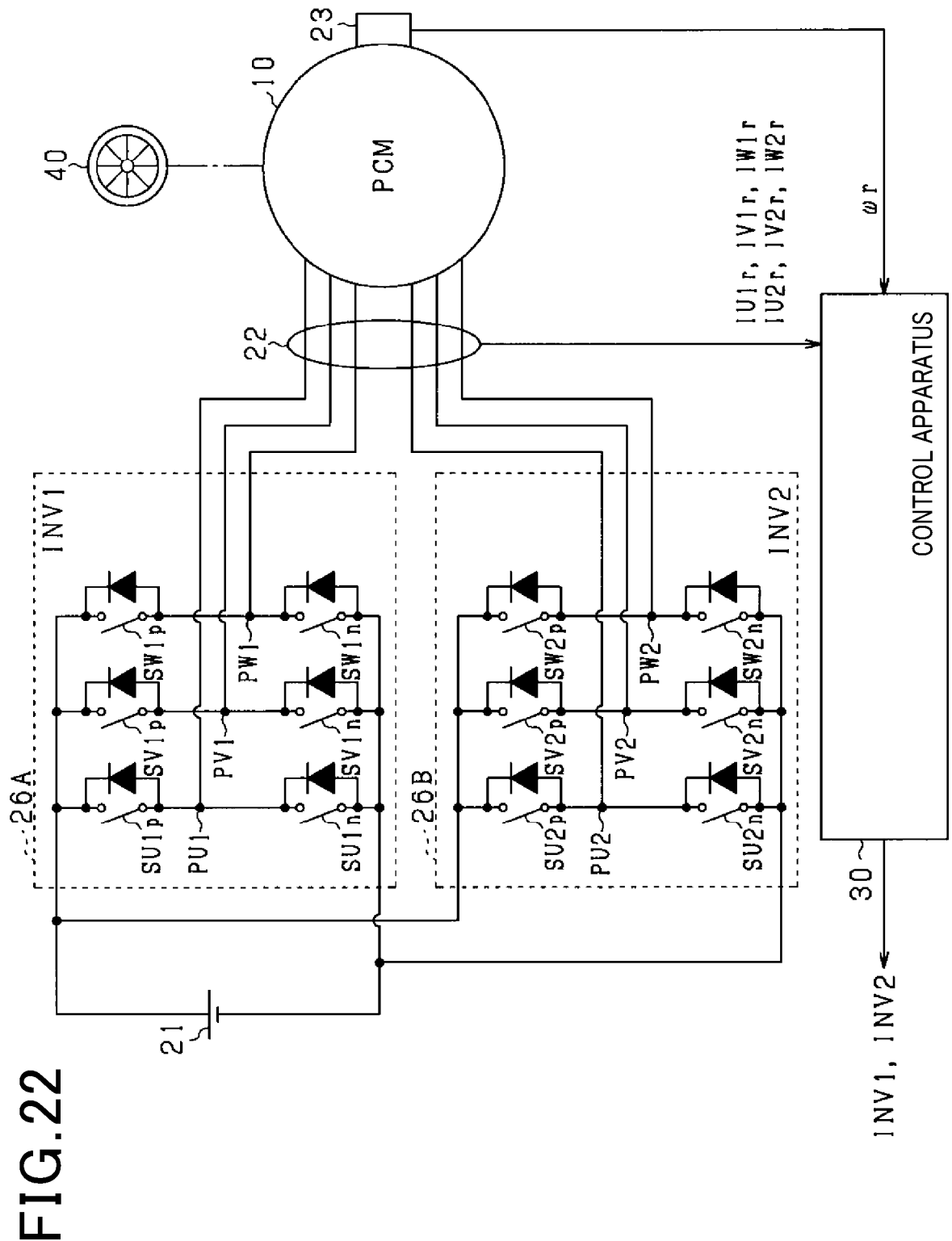
FIG. 22 is a schematic diagram illustrating the overall configuration of an in-vehicle control system according to a modification.

(1) As shown in FIG. 22, the in-vehicle control system may include two three-phase inverters 26A and 26B that respectively correspond to the two winding groups M1 and M2 (i.e., the two three-phase stator coils).

(2) The torque control performed by the control apparatus 30 is not limited to the current control system of FIG. 11 which indirectly controls the torque via current control. For example, a torque control system may be alternatively employed where the command value calculating unit 31 directly calculates the command torque corresponding to 4 poles and the command torque corresponding to 8 poles.

(3) The number of slots 56 formed in the stator core 57 of the rotating electric machine 10 is not limited to 24. For example, the number of slots 56 may alternatively be set to 48.

(4) The number of phases of the rotating electric machine 10 is not limited to 3. For example, the number of phases of the rotating electric machine 10 may alternatively be four or more.

Moreover, the number of sets of the stator coils (i.e., the winding groups) is not limited to two. For example, the number of sets of the stator coils may alternatively be three or more.

In addition, in the above cases, the number of pairs of the upper-arm and lower-arm switches employed in the inverter is equal to (n×m), where n is the number of sets of the stator coils and m is the number of phases of the rotating electric machine 10.

(5) The number of poles of the rotating electric machine 10 may be switchable between A and (n×A), where n is an integer greater than or equal to 2 and A is an even number greater than or equal to 2.

For example, the number of poles of the rotating electric machine 10 may be switchable between 2 and 4 (i.e., A=2 and n=2) or between 8 and 16 (i.e., A=8 and n=2).

Moreover, in the case of the number of poles of the rotating electric machine 10 being switched between 8 and 16, the spatial phase difference Δθph may be set to "360°/(2×8)×2=45°" with 16 poles being the reference of the spatial phase difference Δθph.

In addition, the spatial phase difference Δθph may be set to "360°/(2×A)" with A poles being the reference of the spatial phase difference Δθph. For example, in the first embodiment, since n=2 and A=4, the spatial phase difference Δθph with 4 poles being the reference is set to 45° as described above.

(6) The numbers, between which the number of poles of the rotating electric machine 10 is switched, is not limited to two. Instead, the number of poles of the rotating electric machine 10 may be switchable between three or more numbers. For example, the number of poles of the rotating electric machine 10 may be switchable between 4, 8 and 16. In this case, the control described in the above embodiments may be performed during a pole-number switching period for which the number of poles of the rotating electric machine 10 is switched from one of 4 and 8 to the other or from one of 8 and 16 to the other.

(7) The rotating electric machine 10 is not limited to the in-vehicle main machine, but may alternatively be employed as, for example, an in-vehicle auxiliary machine.

Moreover, a system, which includes a pole-changing rotating electric machine, an inverter and a control apparatus according to the present disclosure is not limited to an in-vehicle control system.

What is claimed is:

1. A control apparatus configured to control a rotating electric machine whose number of poles is changeable,
   the rotating electric machine including a stator, the stator including an annular stator core and n sets of m-phase stator coils wound on the stator core, where n is an integer greater than or equal to 2 and m is an integer greater than or equal to 3,
   the number of poles of the rotating electric machine being switched by the control apparatus from a pre-switching number of poles to a post-switching number of poles, the pre-switching number of poles being one of A and (n×A) and the post-switching number of poles being the other of A and (n×A), where A is an even number greater than or equal to 2,
   the control apparatus comprising:
   a pre-switching control unit configured to control, when the number of poles of the rotating electric machine is equal to the pre-switching number of poles, electric currents flowing in the stator coils to bring pre-switching torque into agreement with pre-switching command torque, the pre-switching torque being torque of the rotating electric machine corresponding to the pre-switching number of poles;
   a post-switching control unit configured to control, when the number of poles of the rotating electric machine is equal to the post-switching number of poles, the electric currents flowing in the stator coils to bring post-switching torque into agreement with post-switching command torque, the post-switching torque being torque of the rotating electric machine corresponding to the post-switching number of poles; and
   a transition control unit configured to control parameters, during a pole-number switching period for which control of the rotating electric machine is switched from control by the pre-switching control unit to control by the post-switching control unit, to make each magnetic pole formed in the stator with the control by the pre-switching control unit not coincident in a circumferential direction of the stator with any magnetic pole which is formed in the stator with the control by the post-switching control unit and has the same polarity as the magnetic pole formed in the stator with the control by the pre-switching control unit, the parameters being the electric currents flowing in the stator coils or voltages applied to the stator coils.

2. The control apparatus as set forth in claim 1, wherein a target angular frequency is represented by a primary angular frequency, which is the angular frequency of rotating magnetic fluxes generated by the electric currents flowing in the stator coils, or a slip angular frequency of the rotating electric machine, and
   during the pole-number switching period, the transition control unit controls the parameters to make directions of vectors of the magnetic fluxes generated with the control by the pre-switching control unit not coincident with directions of vectors of the magnetic fluxes generated with the control by the post-switching control unit while maintaining a relationship of "the target angular frequency corresponding to (n×A) poles:the target angular frequency corresponding to A poles=n:1".

3. The control apparatus as set forth in claim 2, wherein during the pole-number switching period, the transition control unit changes both the target angular frequency corresponding to (n×A) poles and the target angular frequency corresponding to A poles so as to maintain the relationship of "the target angular frequency corresponding to (n×A) poles:the target angular frequency corresponding to A poles=n:1".

4. The control apparatus as set forth in claim 3, wherein high-efficiency frequencies increase with the magnitude of the electric currents flowing in the stator coils, each of the high-efficiency frequencies being the target angular frequency at which the torque of the rotating electric machine is highest with the magnitude of the electric currents flowing in the stator coils set to a given value,
   the pre-switching command torque is the torque of the rotating electric machine corresponding to one of the high-efficiency frequencies which corresponds to the pre-switching number of poles, and the post-switching command torque is the torque of the rotating electric machine corresponding to one of the high-efficiency frequencies which corresponds to the post-switching number of poles.

5. The control apparatus as set forth in claim 2, wherein during the pole-number switching period, the transition control unit controls the voltages applied to the stator coils so that:

the directions of vectors of the voltages applied to the stator coils with the control by the pre-switching control unit are different in phase by 90° from the directions of vectors of the magnetic fluxes generated with the control by the pre-switching control unit; and the directions of vectors of the voltages applied to the stator coils with the control by the post-switching control unit are different in phase by 90° from the directions of vectors of the magnetic fluxes generated with the control by the post-switching control unit.

6. The control apparatus as set forth in claim 1, wherein a target angular frequency is represented by a primary angular frequency, which is the angular frequency of rotating magnetic fluxes generated by the electric currents flowing in the stator coils, or a slip angular frequency of the rotating electric machine, and during the pole-number switching period, the transition control unit:

first controls the parameters to change the target angular frequency to a value corresponding to the post-switching number of poles with the torque of the rotating electric machine kept at the pre-switching command torque; and then controls the parameters to make directions of vectors of the magnetic fluxes generated with the control by the pre-switching control unit not coincident with directions of vectors of the magnetic fluxes generated with the control by the post-switching control unit while maintaining a relationship of "the target angular frequency corresponding to (n×A) poles:the target angular frequency corresponding to A poles=n:1".

7. The control apparatus as set forth in claim 6, wherein high-efficiency frequencies increase with the magnitude of the electric currents flowing in the stator coils, each of the high-efficiency frequencies being the target angular frequency at which the torque of the rotating electric machine is highest with the magnitude of the electric currents flowing in the stator coils set to a given value, the pre-switching command torque is the torque of the rotating electric machine corresponding to one of the high-efficiency frequencies which corresponds to the pre-switching number of poles, and the post-switching command torque is the torque of the rotating electric machine corresponding to one of the high-efficiency frequencies which corresponds to the post-switching number of poles.

8. The control apparatus as set forth in claim 6, wherein during the pole-number switching period, the transition control unit controls the voltages applied to the stator coils so that:

the directions of vectors of the voltages applied to the stator coils with the control by the pre-switching control unit are different in phase by 90° from the directions of vectors of the magnetic fluxes generated with the control by the pre-switching control unit; and the directions of vectors of the voltages applied to the stator coils with the control by the post-switching control unit are different in phase by 90° from the directions of vectors of the magnetic fluxes generated with the control by the post-switching control unit.

9. The control apparatus as set forth in any one of the claim 1, wherein during the pole-number switching period, the transition control unit controls the parameters to make a phase difference between two magnetic poles, which are generated respectively with the control by the pre-switching control unit and with the control by the post-switching control unit and have the same polarity, equal to (360°/(n× A)×2) with (n×A) poles being a reference of the phase difference.

10. The control apparatus as set forth in any one of the claim 1, wherein from a timing after start of the pole-number switching period to an end timing of the pole-number switching period, the transition control unit gradually decreases the pre-switching torque to 0 while gradually increasing the post-switching torque to a value higher than 0.

* * * * *